US012623720B2

(12) United States Patent
Nordberg et al.

(10) Patent No.: US 12,623,720 B2
(45) Date of Patent: May 12, 2026

(54) METHOD AND CONTROL DEVICE FOR CONTROLLING DRIVING OPERATION OF AN ARTICULATED TRACKED VEHICLE

(71) Applicant: Bae Systems Hägglunds Aktiebolag, Örnsköldsvik (SE)

(72) Inventors: Björn Nordberg, Örnsköldsvik (SE); Göran Westman, Moliden (SE); Björn Hellholm, Arnäsvall (SE)

(73) Assignee: Bae Systems Hägglunds Aktiebolag, Örnsköldsvik (SE)

( * ) Notice: Subject to any disclaimer, the term of this patent is extended or adjusted under 35 U.S.C. 154(b) by 711 days.

(21) Appl. No.: 17/786,368

(22) PCT Filed: Dec. 11, 2020

(86) PCT No.: PCT/SE2020/051201
§ 371 (c)(1),
(2) Date: Jun. 16, 2022

(87) PCT Pub. No.: WO2021/126053
PCT Pub. Date: Jun. 24, 2021

(65) Prior Publication Data
US 2023/0018452 A1      Jan. 19, 2023

(30) Foreign Application Priority Data
Dec. 18, 2019     (SE) .................................... 1951490-0

(51) Int. Cl.
B62D 12/02 (2006.01)
B60T 7/20 (2006.01)
(Continued)

(52) U.S. Cl.
CPC ................ B62D 12/02 (2013.01); B60T 7/20 (2013.01); B60T 8/248 (2013.01); B62D 7/02 (2013.01);
(Continued)

(58) Field of Classification Search
CPC ........ B60T 2230/03; B60T 7/20; B60T 8/248; B62D 11/20; B62D 12/00; B62D 12/02; B62D 55/0655; B62D 7/02
See application file for complete search history.

(56) References Cited

U.S. PATENT DOCUMENTS

| | | | |
|---|---|---|---|
| 2,933,143 A | 4/1960 | Ingram et al. | |
| 3,215,219 A | 11/1965 | Forsyth et al. | |
| | (Continued) | | |

FOREIGN PATENT DOCUMENTS

| | | |
|---|---|---|
| CN | 110104061 A | 8/2019 |
| EP | 2604495 A1 | 6/2013 |
| | (Continued) | |

OTHER PUBLICATIONS

Chinese Search Report for Chinese Application No. 202080094428.0 issued on Mar. 31, 2024, 4 pages. English translation.

(Continued)

*Primary Examiner* — Carl C Staubach
(74) *Attorney, Agent, or Firm* — Morrison & Foerster LLP

(57) ABSTRACT

The present invention relates to a method (M1) performed by a control device (100) for controlling driving operation of an articulated tracked vehicle (V). Said articulated tracked vehicle (V) comprises a drive arrangement (120) for operating the vehicle. The articulated tracked vehicle (V) comprises a first vehicle unit (V1) and a second vehicle unit (V2) steerably connected to the first vehicle unit (V1) by means of a steering device (D) for mutually pivoting said vehicle units (V1, V2). The mutual pivoting comprises roll movement about a roll axis (X). The steering device (D) comprises a roll arrangement (A2) for said roll movement. The method comprises the step of controlling (S1) the roll arrangement (A2) of the steering device (D) so as to control mutual roll movement of said vehicle units (V1, V2). The (Continued)

present invention also relates to a control device for controlling driving operation of an articulated tracked vehicle. The present invention also relates to a computer program and a computer readable medium.

11 Claims, 8 Drawing Sheets

(51) Int. Cl.

| | |
|---|---|
| *B60T 8/24* | (2006.01) |
| *B62D 7/02* | (2006.01) |
| *B62D 11/20* | (2006.01) |
| *B62D 55/065* | (2006.01) |

(52) U.S. Cl.
CPC .......... *B62D 11/20* (2013.01); *B62D 55/0655* (2013.01); *B60T 2230/03* (2013.01)

(56) References Cited

U.S. PATENT DOCUMENTS

| | | | | |
|---|---|---|---|---|
| 3,937,289 | A | * | 2/1976 | Dickinson .............. B62D 11/00 |
| | | | | D21/537 |
| 4,645,023 | A | | 2/1987 | Rea et al. |
| 4,966,242 | A | | 10/1990 | Baillargeon |
| 5,411,322 | A | | 5/1995 | Breen |
| 5,632,350 | A | | 5/1997 | Gauvin |
| 6,484,083 | B1 | | 11/2002 | Hayward et al. |
| 7,784,812 | B1 | | 8/2010 | Lares |
| 12,037,042 | B2 | * | 7/2024 | Diong ................. G05D 1/0293 |
| 2004/0226760 | A1 | * | 11/2004 | Loh ........................ B62D 59/04 |
| | | | | 180/6.7 |

| | | | | |
|---|---|---|---|---|
| 2014/0246257 | A1 | * | 9/2014 | Jacobsen ................. F41H 7/005 |
| | | | | 180/14.2 |
| 2016/0083027 | A1 | * | 3/2016 | Hellholm .................. B60P 3/41 |
| | | | | 180/9.44 |
| 2016/0107709 | A1 | * | 4/2016 | Hellholm ............... B62D 7/026 |
| | | | | 903/902 |
| 2016/0229453 | A1 | | 8/2016 | Yang et al. |
| 2017/0320488 | A1 | | 11/2017 | Alm et al. |
| 2019/0001944 | A1 | | 1/2019 | Ying et al. |

FOREIGN PATENT DOCUMENTS

| | | | |
|---|---|---|---|
| SE | 1650840 | A1 | 12/2017 |
| WO | WO-2011049509 | A1 | 4/2011 |
| WO | WO2012/125903 | A2 | 9/2012 |
| WO | WO-2012128706 | A1 | 9/2012 |
| WO | WO2014/182219 | A1 | 11/2014 |

OTHER PUBLICATIONS

Singaporean Search Report for Singaporean Application No. 11202250201U mailed on Apr. 17, 2024, 5 pages.

International Search Report and Written Opinion for International Application No. PCT/SE2020/051201 mailed on Jan. 28, 2021, 11 pages.

Swedish Search Report for Swedish Application No. SE1951490-0 mailed on May 28, 2020, 3 pages.

Extended European Search Report for European Application No. 20900907.5 mailed on Feb. 5, 2024, 7 pages.

Chinese Search Report for Chinese Application No. 202080094428.0 issued on Nov. 5, 2024, 4 pages. English translation.

* cited by examiner

METHOD AND CONTROL DEVICE FOR CONTROLLING DRIVING OPERATION OF AN ARTICULATED TRACKED VEHICLE

CROSS REFERENCE TO RELATED APPLICATIONS

This application is a national stage application under 35 U.S.C. § 371 of International Application No. PCT/SE2020/051201, filed internationally on Dec. 11, 2020, which claims priority to SE 1951490-0, filed Dec. 18, 2019, the entire contents of each are incorporated by reference herein.

TECHNICAL FIELD

The invention relates to a method performed by a control device for controlling driving operation of an articulated tracked vehicle. The invention also relates to a control device for controlling driving operation of an articulated tracked vehicle. The invention also relates to an articulated tracked vehicle. The invention in addition relates to a computer program and a computer readable medium.

BACKGROUND ART

Articulated tracked vehicles may advantageously be used for driving in terrain. Such articulated tracked vehicles comprise a drive arrangement for operating the vehicle. The drive arrangement may be any suitable drive arrangement such as an internal combustion engine for operating the vehicle, an electrical drive arrangement for electrically operating the vehicle or a hybrid drive arrangement for hybrid operation of the vehicle. Such an articulated tracked vehicle comprises a front vehicle unit and a rear vehicle unit steerably connected to the front vehicle unit by means of a steering device for mutually pivoting said vehicle units. The mutual pivoting may comprise pivoting about different axis. The mutual pivoting may comprise pivoting about a steering axis, the steering device comprising a steering arrangement for said steering. The mutual pivoting may comprise pivoting about a roll axis, the steering device comprising a roll arrangement for said roll movement. The mutual pivoting may comprise tilting about a tilt axis, the steering device comprising a tilt arrangement for tilt movement.

When driving such articulated tracked vehicle the operator of the vehicle may change the angle of the horizontal plane between the front and rear vehicle units by means of a steering wheel. The roll arrangement is arranged to facilitate for the vehicle units to provide a roll movement relative to each other so that the front and rear vehicle units may follow the ground surface. The roll arrangement may however affect driving of the tracked articulated vehicle, e.g. on soft surface which requires skills from the operator. There may also be a risk of the rear vehicle unit tipping over.

There is thus a need for improving controlling driving operation of such an articulated tracked vehicle.

OBJECTS OF THE INVENTION

An object of the present invention is to provide a method performed by a control device for controlling driving operation of an articulated tracked vehicle.

Another object of the present invention is to provide a control device for controlling driving operation of an articulated tracked vehicle.

Another object of the present invention is to provide an articulated tracked vehicle comprising such a control device.

SUMMARY

These and other objects, apparent from the following description, are achieved by a method, a control device, an articulated tracked vehicle, a computer program and a computer readable medium, as set out in the appended independent claims. Preferred embodiments of the method and the control device are defined in appended dependent claims.

Specifically an object of the invention is achieved by a method performed by a control device for controlling driving operation of an articulated tracked vehicle. Said articulated tracked vehicle comprises a drive arrangement for operating the vehicle. The articulated tracked vehicle comprises a first vehicle unit and a second vehicle unit steerably connected to the first vehicle unit by means of a steering device for mutually pivoting said vehicle units. The mutual pivoting comprises roll movement about a roll axis. The steering device comprises a roll arrangement for said roll movement. The method comprises the step of: controlling the roll arrangement of the steering device so as to control mutual roll movement of said vehicle units. Hereby manoeuvrability is improved when driving in soft conditions. Hereby safety during drive of the vehicle at relatively higher speeds on slippery and/or uneven ground is improved in that the risk of the vehicle tipping over/rolling over may be reduced. Hereby manoeuvrability and safety during amphibious operation may also be improved. The step of controlling the roll arrangement of the steering device so as to control mutual roll movement of said vehicle units is according to an aspect configured to be performed so as to reduce the risk of the vehicle tipping over. The step of controlling the roll arrangement of the steering device so as to control mutual roll movement of said vehicle units is configured to be performed during drive of the vehicle.

According to an embodiment of the method, the step of controlling the roll arrangement is performed by means of a control arrangement. Hereby the mutual roll movement of said vehicle units may be efficiently controlled for improved manoeuvrability and avoidance of the vehicle tipping over/rolling over. The controlling of the roll arrangement by means of a control arrangement may comprise providing control functions on the roll arrangement. The roll arrangement may comprise a rotation member on which the control arrangement may act, the rotation member providing said roll axis about which the vehicle units may provide mutual roll movement.

According to an embodiment of the method, the step of controlling the roll arrangement by means of the control arrangement comprises providing a brake function and/or a locking function and/or a damping function and/or an actuation function of the control arrangement. Hereby the mutual roll movement of said vehicle units may be efficiently controlled for improved manoeuvrability and avoidance of the vehicle tipping over/rolling over. The step of controlling the roll arrangement by means of the control arrangement may comprise providing a brake function by means of a brake member acting on the roll arrangement. The step of controlling the roll arrangement by means of the control arrangement may comprise providing a locking function by means of a locking member acting on the roll arrangement. The step of controlling the roll arrangement by means of the control arrangement may comprise providing a damping function by means of a damping member acting on the roll arrangement. The step of controlling the roll arrangement by means of the control arrangement may comprise providing an actuation function by means of an actuation member acting on the roll arrangement. The control arrangement may comprise an electric motor and/or a hydraulic motor configured to act on the roll arrangement via e.g. a gear arrangement, a belt arrangement, a chain arrangement or the like. The step of controlling the roll arrangement may be performed by means of an electric motor and/or a hydraulic motor configured to act on the roll arrangement via e.g. a gear arrangement, a belt arrangement, a chain arrangement or the like. The control arrangement may comprise a linear hydraulic cylinder or actuator configured to be arranged transversely to the longitudinal extension of the steering device and hence longitudinal extension of the vehicle, wherein braking, damping, locking and/or actuation function may be integrated in such a linear hydraulic cylinder or actuator.

According to an embodiment of the method, the step of controlling mutual roll movement of said vehicle units further comprises controlling one or more of: power provision of the drive arrangement; a braking system of the vehicle; and a transmission arrangement of the vehicle. Hereby the mutual roll movement of said vehicle units may be even more efficiently controlled for improved manoeuvrability and avoidance of the vehicle tipping over/rolling over. Hereby control of the mutual roll movement of said vehicle units by controlling the roll arrangement of the steering device may be more efficiently controlled due to the fact that the control of the roll arrangement may be performed in cooperation with controlling one or more of: power provision of the drive arrangement; a braking system of the vehicle; and a transmission arrangement of the vehicle.

According to an aspect of the present disclosure the step of controlling the roll arrangement of the steering device by means of said control arrangement so as to control mutual roll movement of said vehicle units so as to reduce the risk of the vehicle tipping over may be performed based on the steps of controlling one or more of: power provision of the drive arrangement; a braking system of the vehicle; and a transmission arrangement of the vehicle.

According to an aspect of the present disclosure the step of controlling the roll arrangement of the steering device by means of said control arrangement and the steps of controlling one or more of: power provision of the drive arrangement; a braking system of the vehicle; and a transmission arrangement of the vehicle may be cooperatively performed and adapted during drive of the vehicle so as to optimize control of mutual roll movement of said vehicle units so as to reduce the risk of the vehicle tipping over.

According to an aspect of the present disclosure the steps of controlling one or more of: power provision of the drive arrangement; a braking system of the vehicle; and a transmission arrangement of the vehicle so as to control mutual roll movement of said vehicle units so as to reduce the risk of the vehicle tipping over may be performed based on the step of controlling the roll arrangement of the steering device by means of said control arrangement.

According to an embodiment of the method, the step of controlling mutual roll movement of said vehicle units is performed based on one or more of: roll angle between said vehicle units; power of said drive arrangement; speed of drive wheels; speed of transmission. By thus controlling mutual roll movement of said vehicle units based on such information, manoeuvrability and avoidance of the vehicle tipping over/rolling over may be efficiently obtained. The method may comprise the step of determining one or more of: steering angle between said vehicle units; power of said drive arrangement; speed of drive wheels; speed of transmission. The method may comprise the step of receiving information about one or more of: steering angle between said vehicle units from steering angle determination device; power of said drive arrangement from power determination device; speed of drive wheels from drive wheel speed determination device; speed of transmission from transmission speed determination device.

The method may comprise the step of determining the stability of the ground on which the vehicle is driving. The step of determining the stability of the ground on which the vehicle is driving may comprise determining the softness of the ground and/or unevenness of the ground. The step of determining the stability of the ground may be so as to identify possible risk of the trailing vehicle unit ending up not following the tracks created by the leading vehicle unit of the articulated tracked vehicle. The method may comprise the step of determining the risk of the trailing vehicle unit derailing from the tracks created by the leading vehicle; and, taking action so as to reduce the risk of the trailing vehicle derailing from the tracks of the leading vehicle if there is a certain risk, e.g. if the risk exceeds a certain threshold. The step of taking action may comprise controlling roll movement e.g. by providing a braking action on the roll arrangement. The method may comprise the step of determining the speed of the vehicle; and, if a certain instability of the ground has been determined, taking action so as to reduce relative roll movement of the vehicle units and reduce the risk of the trailing vehicle unit tipping over. The step of taking action may comprise controlling roll movement e.g. by providing a damping action, locking action or the like on the roll arrangement. The method may comprise the step of determining coincident spinning of tracks of track assembly on one side of leading vehicle unit and spinning of tracks of track assembly on opposite side of trailing vehicle unit; and, if so, taking action so as to reduce relative roll movement of the vehicle units. The step of taking action may comprise controlling roll movement e.g. by providing a damping action, locking action or the like on the roll arrangement. The method may comprise the step of determining load and load distribution of the respective vehicle unit and possible displaced load e.g. to one side in one of the vehicle units and the other side of the other vehicle unit. For an amphibious articulated tracked vehicle, during a swimming operation, the method may comprise the step of taking action so as to facilitate swimming, if such a displace load distribution in the respective vehicle unit is determined. The step of taking action may comprise controlling roll movement so as to reduce the roll angle between the vehicle units.

The method may comprise the step of determining risk of tipping about the roll axis of the trailing or leading vehicle unit; and, if there is a certain risk of such tipping of a vehicle unit, taking action comprising controlling roll movement and/or providing reduced power of said drive arrangement and/or braking of one or more tracks of track assemblies of the vehicle units.

Specifically an object of the invention is achieved by a control device for controlling driving operation of an articulated tracked vehicle. Said articulated tracked vehicle comprises a drive arrangement for operating the vehicle. The articulated tracked vehicle comprises a first vehicle unit and a second vehicle unit steerably connected to the first vehicle unit by means of a steering device for mutually pivoting said vehicle units. The mutual pivoting comprises roll movement about a roll axis. The steering device comprises a roll arrangement for said roll movement. The control device is configured to control the roll arrangement of the steering device so as to control mutual roll movement of said vehicle units.

According to an embodiment the control device is configured to control the roll arrangement by means of a control arrangement.

According to an embodiment of the control device, the control arrangement comprises a brake member for providing a brake function and/or a locking member for providing a locking function and/or an damping member for providing an damping function and/or an actuator member for providing an actuation function.

According to an embodiment, the control device, when controlling mutual roll movement of said vehicle units, further being configured to control one or more of: power provision of the drive arrangement; a braking system of the vehicle; and a transmission arrangement of the vehicle.

According to an embodiment, the control device, when controlling mutual roll movement of said vehicle units, is configured to perform said control based on one or more of: roll angle between said vehicle units; steering angle between said vehicle units; power of said drive arrangement; speed of drive wheels; speed of transmission.

The control device according to the present disclosure has the advantages according to the corresponding method as set out herein.

Specifically an object of the invention is achieved by an articulated tracked vehicle comprising a control device as set out herein.

Specifically an object of the invention is achieved by a computer program for controlling steering of a vehicle, said computer program comprising program code which, when run on a control device or another computer connected to the control device, causes the control device to perform the method steps as set out herein.

Specifically an object of the invention is achieved by a computer readable medium comprising instructions which, when executed by a computer, cause the computer to carry out the method as set out herein.

BRIEF DESCRIPTION OF THE DRAWINGS

For a better understanding of the present invention reference is made to the following detailed description when read in conjunction with the accompanying drawings, wherein like reference characters refer to like parts throughout the several views, and in which.

DETAILED DESCRIPTION

Hereinafter the term "link" refers to a communication link which may be a physical connector, such as an optoelectronic communication wire, or a non-physical connector such as a wireless connection, for example a radio or microwave link.

Figure 1A:
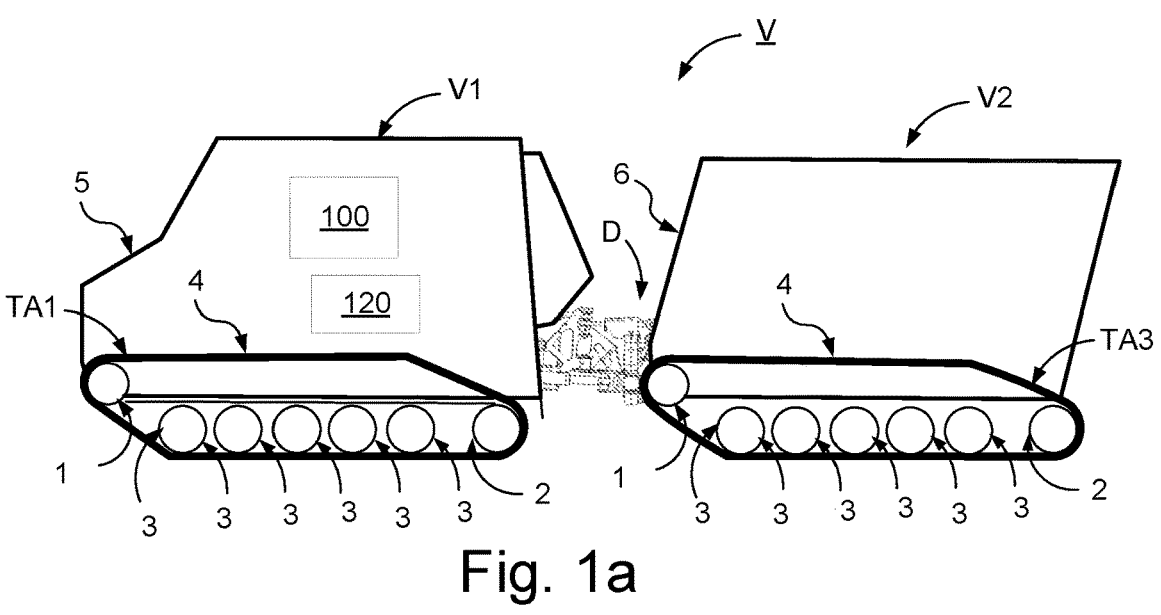
FIG. 1a schematically illustrates a side view of an articulated tracked vehicle according to an embodiment of the present disclosure.
Figure 1B:
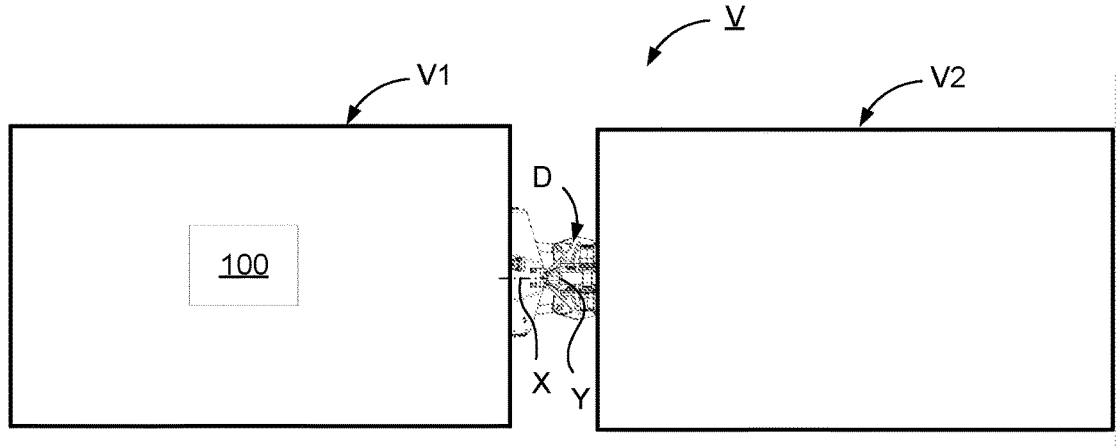
FIG. 1b schematically illustrates a plan view of the articulated tracked vehicle in FIG. 1a according to an embodiment of the present disclosure.
Figure 1C:
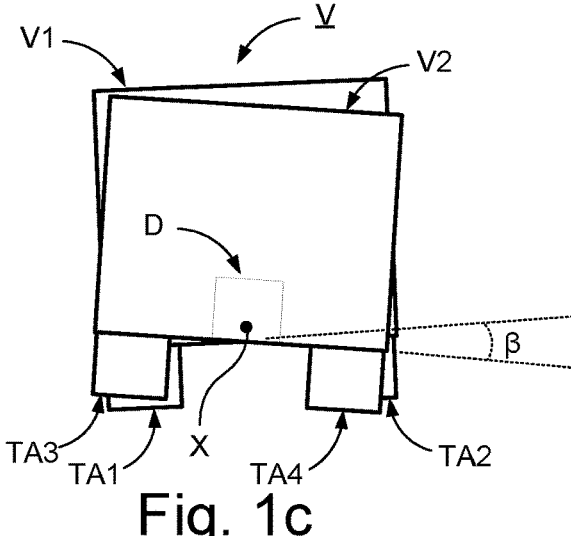
FIG. 1c schematically illustrates a rear view of the articulated tracked vehicle in FIG. 1a according to an embodiment of the present disclosure.

FIG. 1a schematically illustrates a side view of an articulated tracked vehicle V according to an embodiment of the present disclosure, FIG. 1b. schematically illustrates a plan view of the articulated tracked vehicle V in FIG. 1a, and FIG. 1c schematically illustrates a rear view of the articulated tracked vehicle V in FIG. 1a. The articulated tracked vehicle V comprises a first vehicle unit V1 and a second vehicle unit V2 steerably connected to the first vehicle unit by means of a steering device D for mutually pivoting the vehicle units V1, V2 of the articulated tracked vehicle V. The first vehicle unit V1 is here the leading vehicle unit, i.e. the front vehicle unit. The second vehicle unit V2 is here the trailing vehicle unit, i.e. the rear vehicle unit.

The first vehicle unit V1 comprises a track assembly pair TA1, TA2, see FIG. 1c. The track assembly pair comprises a left track assembly TA1 and a right track assembly TA2 for driving the first vehicle unit V1, the left track assembly TA1 being shown in FIG. 1a. The second vehicle unit V2 comprises a track assembly pair TA3, TA4, see FIG. 1c. The track assembly pair comprises a left track assembly TA3 and a right track assembly for driving the second vehicle unit V2, the left track assembly TA3 being shown in FIG. 1a.

The first vehicle unit V1 comprises a vehicle body 5, which according to an aspect of the present disclosure may comprise the chassis of the first vehicle unit V1 and bodywork. The track assembly pair of the first vehicle unit V1 may be suspendedly connected to the vehicle body 5. The second vehicle unit V2 comprises a vehicle body 6, which according to an aspect of the present disclosure may comprise the chassis of the second vehicle unit V2 and bodywork. The track assembly pair of the second vehicle unit V2 may be suspendedly connected to the vehicle body 6.

Each track assembly comprises a drive wheel 1, a tension wheel 2, a set of road wheels 3 and an endless track 4 arranged to run over said wheels. Here the drive wheel 1 is arranged in the front, the tension wheel 2 is arranged in the back and the road wheels 3 are arranged between the drive wheel 1 and the tension wheel 2. The articulated tracked vehicle V according to the present disclosure may however have track assemblies with any suitable arrangement of drive wheel, tension wheel and road wheels.

The exemplified articulated tracked vehicle may be operated in any suitable way. The exemplified vehicle may be operated by means of an internal combustion engine. The exemplified vehicle may be an electrically operated vehicle. The exemplified vehicle may be diesel electrically operated. The exemplified articulated tracked vehicle may be a hybrid articulated tracked vehicle.

The exemplified articulated tracked vehicle may comprise any suitable drive arrangement for driving the vehicle. The articulated tracked vehicle V comprises a drive arrangement 120, see FIG. 1*a*.

The articulated tracked vehicle V comprises a steering device D according to the present disclosure. The steering device D is arranged for mutually steering the first and second vehicle units V1, V2 of the articulated tracked vehicle V. The second vehicle unit V2 is thus steerably connected to the first vehicle unit V1 by means of the steering device D for mutually pivoting said vehicle units V1, V2. The first and second vehicle units V1, V2 of the articulated vehicle V are consequently steerably interconnected by means of the steering device D. The mutual pivoting of first and second vehicle units V1, V2 comprises roll movement about a roll axis X, see FIG. 1*c*. The steering axis Y is provided by the steering device D. In FIG. 1*c* the first vehicle unit V1 and second vehicle unit V2 are mutually pivoted an angle β relative to each other. The mutual pivoting of first and second vehicle units V1, V2 may comprise steering movement about a steering axis Y, see FIG. 1*b*.

A control device 100 for controlling driving operation of the articulated tracked vehicle V is provided. The control device 100 is according to an embodiment comprised in the articulated tracked vehicle V. The articulated tracked vehicle V comprises, according to an embodiment, a control device 100 for controlling driving operation of an articulated tracked vehicle according to FIG. 5.

Figure 6:
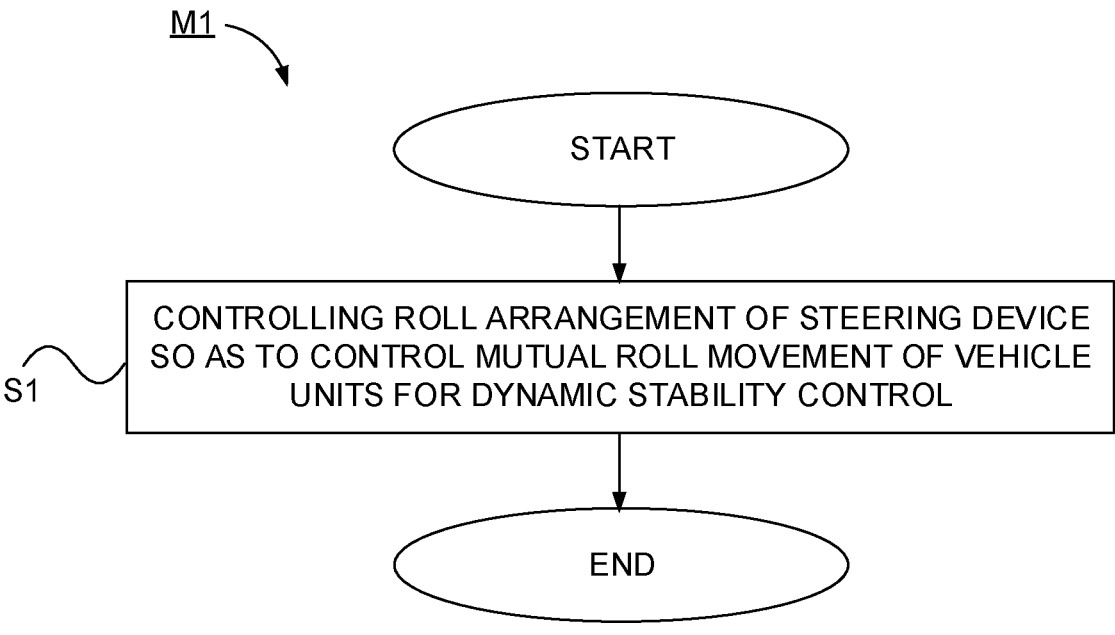
FIG. 6 schematically illustrates a flowchart of a method performed by a control device for controlling steering of a an articulated tracked vehicle according to an embodiment of the present disclosure.

The articulated tracked vehicle V is, according to an embodiment, arranged to be operated in accordance with a method M1 for controlling driving operation of an articulated tracked vehicle according to FIG. 6.

Figure 7:
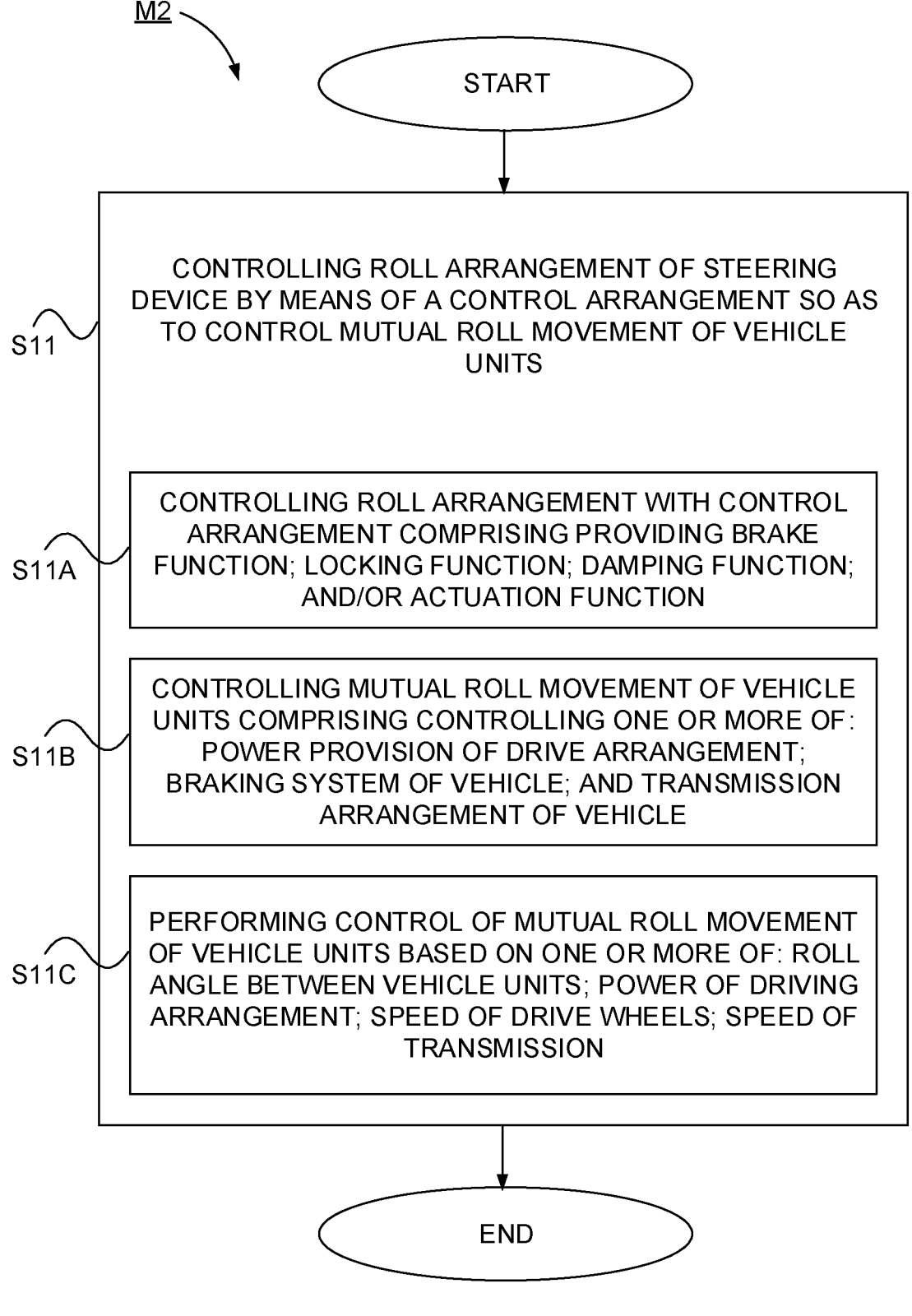
FIG. 7 schematically illustrates a flowchart of a method performed by a control device for controlling steering of an articulated tracked vehicle according to an embodiment of the present disclosure.

The articulated tracked vehicle V is, according to an embodiment, arranged to be operated in accordance with a method M2 for controlling driving operation of an articulated tracked vehicle according to FIG. 7.

Figure 2A:
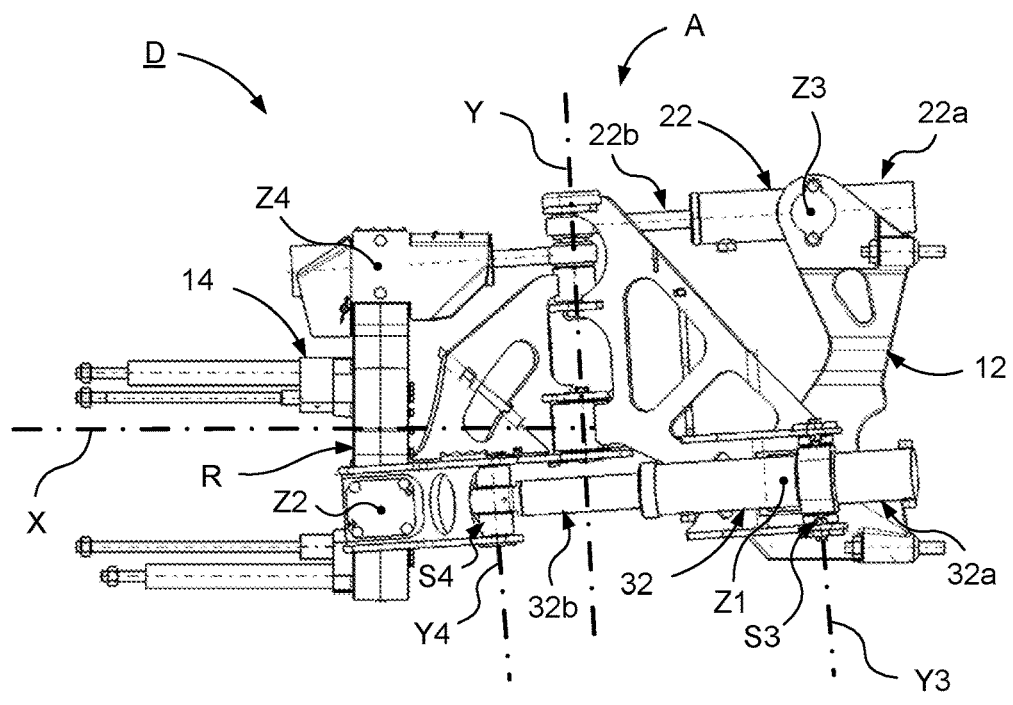
FIG. 2a schematically illustrates a side view of a steering device according to an embodiment of the present disclosure.
Figure 2B:
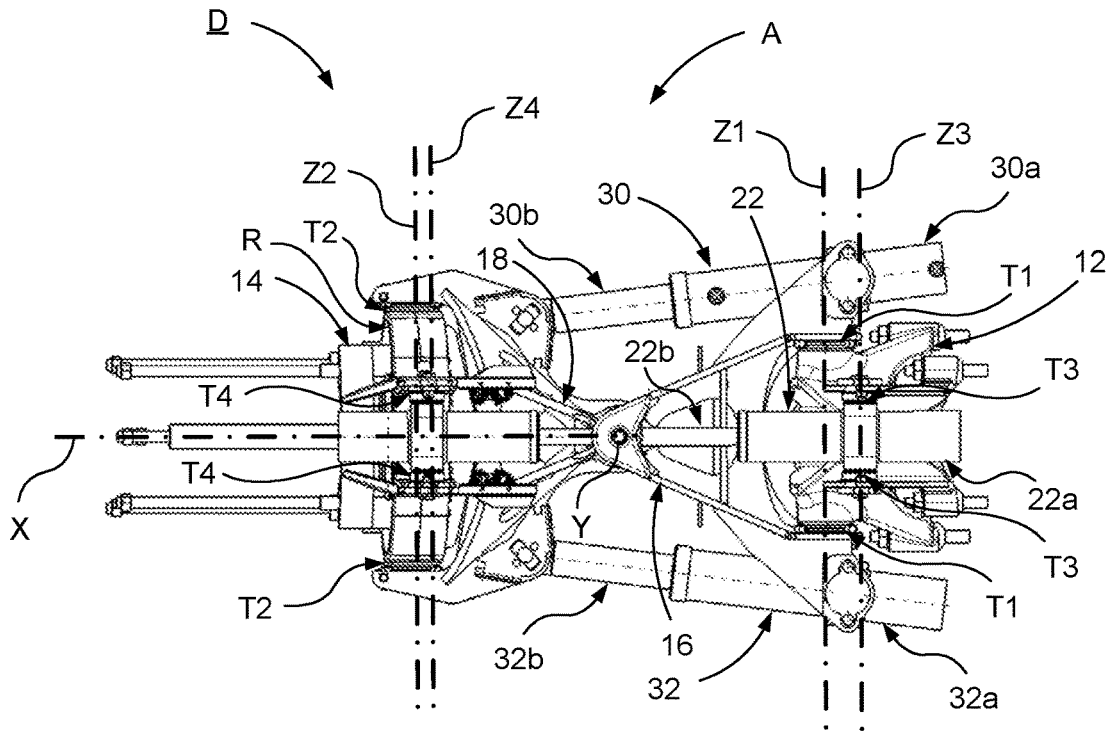
FIG. 2b schematically illustrates a side plan view of the steering device in FIG. 2a according to an embodiment of the present disclosure.
Figure 3A:
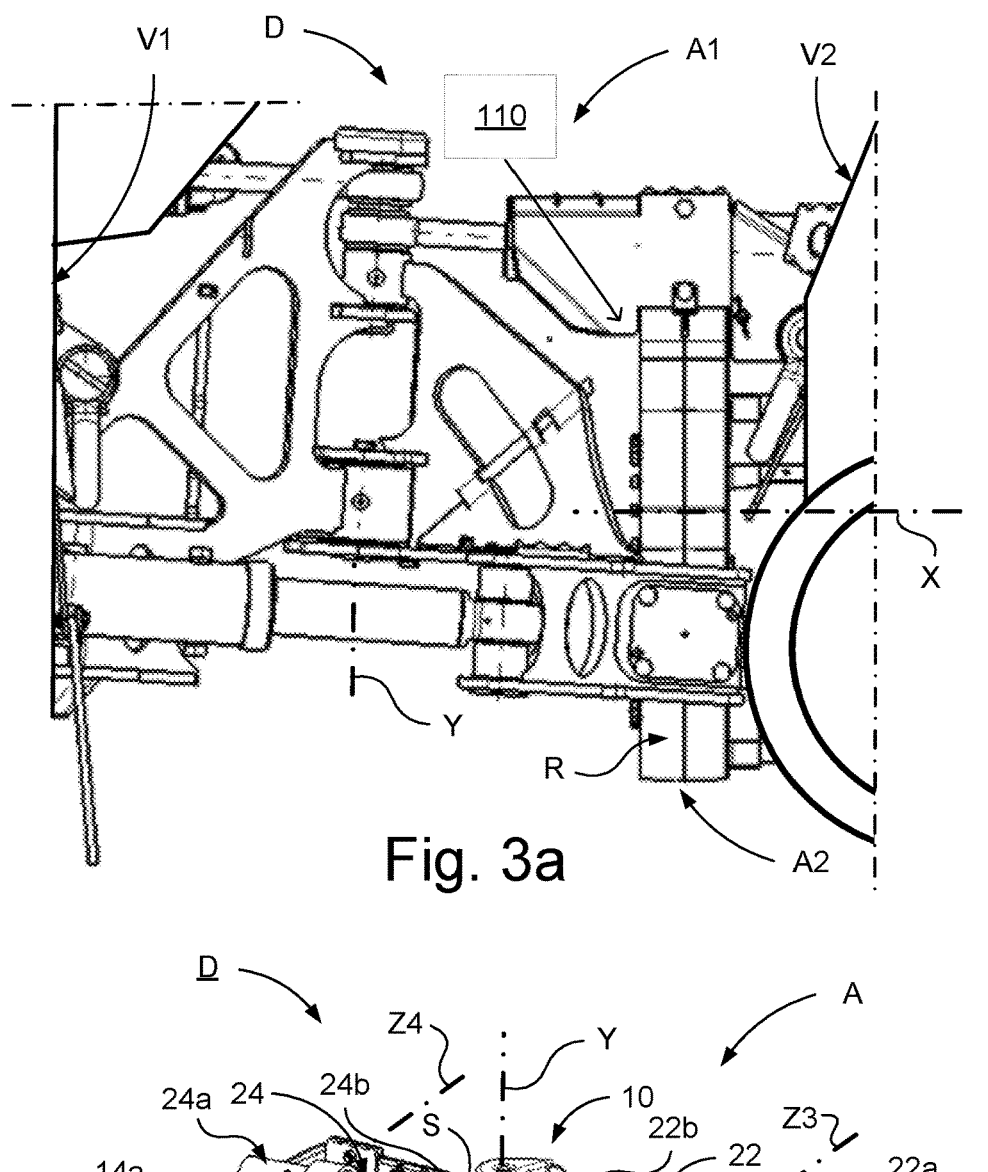
FIG. 3a schematically illustrates a side view of a portion of the articulated tracked vehicle in FIG. 1a with the steering device in FIG. 2a according to an embodiment of the present disclosure.
Figure 3B:
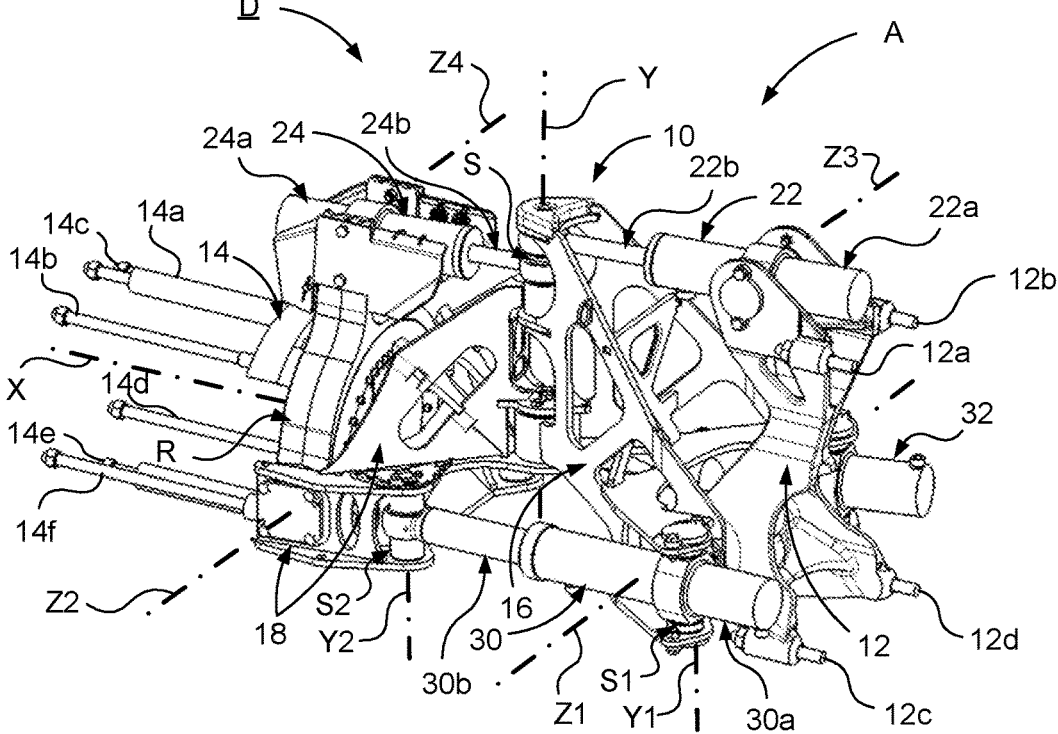
FIG. 3b schematically illustrates a perspective view of the steering device in FIG. 2a according to an embodiment of the present disclosure.

FIG. 2*a* schematically illustrates a side view of a steering device according to an embodiment of the present disclosure, FIG. 2*b* schematically illustrates a plan view of the steering device in FIG. 2*a*, FIG. 3*a* schematically illustrates a side view of a portion of the articulated tracked V vehicle in FIG. 1*a* with the steering device D, and FIG. 3*b* schematically illustrates a perspective view of the steering device in FIG. 2*a*.

The steering device D is configured to steerably interconnect a first vehicle unit and a second vehicle unit of an articulated tracked vehicle, e.g. an articulated tracked vehicle according to FIG. 1*a-b*, for mutually pivoting the first vehicle unit and the second vehicle unit.

The steering device D has a longitudinal extension corresponding to the longitudinal extension of the vehicle units V1, V2 of the articulated tracked vehicle V, see FIGS. 1*a* and 3*a*.

The steering device D comprises a front fastening member 12 arranged to be assembled at the first vehicle unit, i.e. the front vehicle unit. The front fastening member 12 is intended to be arranged in connection to the rear end of the front vehicle unit V1 of the articulated tracked vehicle, see also FIGS. 1*a* and 3*a*.

The front fastening member 12 is intended for fixed non-rotational assembling at the rear end of the front vehicle unit V1 of the articulated tracked vehicle, see also FIG. 1*a*. The fastening member 12 comprises a number of fasteners 12*a*, 12*b*, 12*c*, 12*d* for assembling the steering device D to a rear portion of the front vehicle unit.

The steering device D comprises a rear fastening member 14 arranged to be assembled at the second vehicle unit, i.e. the rear vehicle unit. The rear fastening member 14 is intended to be arranged in connection to the front end of the rear vehicle unit V2 of the articulated tracked vehicle V, see also FIGS. 1*a* and 3*a*. The rear fastening member 14 is thus intended for assembling at the front end of the rear vehicle unit.

The rear fastening member 14 is intended for fixed non-rotational assembling at the front end of the rear vehicle unit V2 of the articulated tracked vehicle, see also FIGS. 1*a* and 3*a*. The fastening member 14 comprises a number of fasteners 14*a*, 14*b*, 14*c*, 14*d*, 14*e*, 14*f* for assembling the steering device to a front portion of the rear vehicle unit.

The steering device D further comprises a front steering link 16. The front steering link 16 is pivotably connected to said front fastening member 12 about a front tilt axis Z1 running in the transversal direction relative to the longitudinal extension of the steering device D. The front tilt axis is Z1 is running in the transversal direction of the front vehicle unit when the steering device D is connected to the front vehicle unit. The front steering link 16 is pivotably connected to said front fastening member 12 about a front tilt shaft configuration T1 for pivotable movement about the front tilt axis Z1 so as to facilitate tilt movement of the front vehicle unit of the articulated tracked vehicle relative to the front steering link 16.

The steering device D further comprises a rear steering link 18. The rear steering link 18 is rotatably connected to said rear fastening member 14 about a roll axis X running in the longitudinal direction of the rear vehicle unit, when the steering device D is connected to the rear vehicle unit. The rear steering link 18 is, according to this example, rotatably connected to said rear fastening member 14 about the roll axis X via a rotation member R configured to facilitate rotatable movement of the rear steering member 14 relative to the rear steering link 18. The rotation member R is, according to this example, rotatably journalled in bearings for facilitating the rotational movement of the rear steering member 14 relative to the rear steering link 18 about the roll axis X. The rear steering link 18 is thus rotatably connected to said rear fastening member 14 so as to allow rotation of the front vehicle unit relative to the rear vehicle unit about the roll axis X. Thus, hereby different side inclination positions of the front vehicle unit relative to the rear vehicle units is facilitated. The rotation member R may be comprised in a roll arrangement A2. The rotation member R, rear fastening member 14 and rear steering link 18 may be comprised in the roll arrangement A2. The steering device D may thus comprise a roll arrangement A2 comprising the rotation member R, rear fastening member 14 and rear steering link 18.

FIG. 3a schematically illustrates a side view of a portion of the leading and trailing vehicle units V1, V2 of the articulated tracked vehicle in FIG. 1a with the steering device D.

The roll arrangement A2 may be configured to be controlled by means of a control arrangement 110. The controlling of the roll arrangement A2 by means of a control arrangement may comprise providing control functions on the roll arrangement A2. The control arrangement 110 may be configured to act on the rotation member providing said roll axis about which the vehicle units V1, V2 may provide mutual roll movement.

The control arrangement 110 may comprise an electric motor and/or a hydraulic motor configured to act on the roll arrangement A2 via e.g. a gear arrangement, a belt arrangement, a chain arrangement or the like. The roll arrangement A2 may be controlled by means of an electric motor and/or a hydraulic motor configured to act on the roll arrangement via e.g. a gear arrangement, a belt arrangement, a chain arrangement or the like. The control arrangement 110 may comprise a linear hydraulic cylinder or actuator configured to be arranged transversely to the longitudinal extension of the steering device and hence longitudinal extension of the vehicle, wherein braking, damping, locking and/or actuation function may be integrated in such a linear hydraulic cylinder or actuator.

The rear steering link 18 is pivotably connected to said rear fastening member 14 about a rear tilt axis Z2 running in the transversal direction relative to the longitudinal extension of the steering device D. The rear tilt axis is Z2 running in the transversal direction of the rear vehicle unit when the steering device D is connected to the rear vehicle unit. The rear steering link 18 is pivotably connected to said rear fastening member 14 about a rear tilt shaft configuration T2 for pivotable movement about the rear tilt axis Z2 so as to facilitate tilt movement of the rear vehicle unit of the articulated tracked vehicle relative to the rear steering link 18.

The front steering link 16 and rear steering link 18 are pivotably connected about a steering axis Y running in the vertical direction relative to the longitudinal extension of the steering device D. The front steering link 16 and rear steering link 18 are pivotably about a steering shaft S. The front and rear steering link 16, 18 are forming a steering link unit. The steering device D thus comprises an essentially vertical steering shaft S about which the vehicle units are pivotable when connected to the steering device D.

The front fastening member 12, rear fastening member 14, front steering link 16 and rear steering link 18 may be comprised in a steering member 10. The steering device D may thus comprise a steering member 10 for facilitating mutual pivoting about the steering axis Y. The steering device D may thus comprise a steering member 10 comprising the front fastening member 12, rear fastening member 14, front steering link 16 and rear steering link 18.

The steering device D further comprises a front tilt cylinder unit 22 arranged in the upper front portion of the steering device D in connection to the front fastening member 12. The front tilt cylinder unit 22 comprises a cylinder part 22a and a piston rod part 22b. The front tilt cylinder unit 22 is according to an embodiment a hydraulic tilt cylinder unit 22. The front cylinder unit 22 is configured to run in the longitudinal extension of the steering device D. The front cylinder unit 22 is configured to run in the longitudinal extension of the front vehicle unit when the steering device D is connected to the front vehicle unit.

The steering device D further comprises a rear tilt cylinder unit 24 arranged in the upper front portion of the steering device D in connection to the rear fastening member 14. The rear tilt cylinder unit 24 comprises a cylinder part 24a and a piston rod part 24b. The rear tilt cylinder unit 24 is according to an embodiment a hydraulic tilt cylinder unit 24. The rear cylinder unit 24 is configured to run in the longitudinal extension of the steering device D. The rear cylinder unit 24 is configured to run in the longitudinal extension of the rear vehicle unit when the steering device D is connected to the rear vehicle unit.

The front cylinder unit 22 is pivotably connected to the upper portion of the front fastening member 12 about an upper front tilt axis Z3. The upper front tilt axis Z3 is running in the transversal direction relative to the longitudinal extension of the steering device D. The upper front tilt axis is Z3 is running in the transversal direction of the front vehicle unit when the steering device D is connected to the front vehicle unit. The front cylinder unit 22 is pivotably connected to the upper portion of the front fastening member 12 about an upper front tilt shaft configuration T3 for pivotable movement about the upper front tilt axis Z3 so as to facilitate tilt movement of the front vehicle unit of the articulated tracked vehicle relative to the front cylinder unit 22.

The piston rod part 22b of the front cylinder unit 22 is pivotably connected to the steering link unit, i.e. to the steering shaft S, so that the front cylinder unit 22 is pivotable about the steering axis Y.

The rear cylinder unit 24 is pivotably connected to the upper portion of the rear fastening member 14 about an upper rear tilt axis Z4. The upper rear tilt axis Z4 is running in the transversal direction relative to the longitudinal extension of the steering device D. The rear cylinder unit 24 is pivotably connected to the upper portion of the rear fastening member 14 about an upper rear tilt shaft configuration T4 for pivotable movement about the upper rear tilt axis Z4 so as to facilitate tilt movement of the rear vehicle unit of the articulated tracked vehicle relative to the rear cylinder unit 24.

The piston rod part 24b of the rear cylinder unit 24 is pivotably connected to the steering link unit, i.e. to the steering shaft S, so that the rear cylinder unit 24 is pivotable about the steering axis Y.

The steering device D further comprises a first steering cylinder unit 30 arranged in the lower part of the steering device D along the left side of the steering device. The first steering cylinder unit 30 comprises a cylinder part 30a and a piston rod part 30b. The first steering cylinder unit 30 is according to an embodiment a hydraulic steering cylinder unit 30. The first steering cylinder unit 30 is configured to run in the longitudinal extension of the steering device D. See FIG. 3b.

The cylinder part 30a of the a first steering cylinder unit 30 is pivotably connected to the front steering link 16 about a front left steering axis Y1 running in the vertical direction on the front left side of the steering device D. The cylinder part 30a of the first steering cylinder unit 30 is pivotably connected to the front steering link 16 about a front left steering shaft configuration S1 for pivotable movement about the front left steering axis Y1 so as to facilitate mutual pivoting of the front vehicle unit and rear vehicle unit of the articulated tracked vehicle about the steering axis Y. See FIG. 3b.

The piston rod part 30*b* of the first steering cylinder unit 30 is pivotably connected to the rear steering link 18 about a rear left steering axis Y2 on the rear left side of the steering device D. The piston rod part 30*b* of the first steering cylinder unit 30 is pivotably connected to the rear steering link 18 about a rear left steering shaft configuration S2 for pivotable movement about the rear left steering axis Y2 so as to facilitate mutual pivoting of the front vehicle unit and rear vehicle unit of the articulated tracked vehicle about the steering axis Y. See FIG. 3*b*.

The steering device D further comprises a second steering cylinder unit 32 arranged in the lower part of the steering device D along the right side of the steering device. The second steering cylinder unit 32 comprises a cylinder part 32*a* and a piston rod part 32*b*. The second steering cylinder unit 32 is according to an embodiment a hydraulic steering cylinder unit 32. The second steering cylinder unit 32 is configured to run in the longitudinal extension of the steering device D. See FIG. 2*a*.

The cylinder part 32*a* of the a second steering cylinder unit 32 is pivotably connected to the front steering link 16 about a front right steering axis Y3 running in the vertical direction on the front right side of the steering device D. The cylinder part 32*a* of the second steering cylinder unit 32 is pivotably connected to the front steering link 16 about a front right steering shaft configuration S1 for pivotable movement about the front right steering axis Y3 so as to facilitate mutual pivoting of the front vehicle unit and rear vehicle unit of the articulated tracked vehicle about the steering axis Y. See FIG. 2*a*.

The piston rod part 32*b* of the second steering cylinder unit 32 is pivotably connected to the rear steering link 18 about a rear right steering axis Y4 on the rear right side of the steering device D. The piston rod part 32*b* of the second steering cylinder unit 32 is pivotably connected to the rear steering link 18 about a rear right steering shaft configuration S2 for pivotable movement about the rear right steering axis Y4 so as to facilitate mutual pivoting of the front vehicle unit and rear vehicle unit of the articulated tracked vehicle about the steering axis Y. See FIG. 2*a*.

The steering member 10 and first steering cylinder unit 30 and second steering cylinder unit 32 may be comprised in a steering arrangement A1. The steering device D may thus comprise a steering arrangement A1 for facilitating the steering movement about the steering axis Y. The steering device D may thus comprise a steering arrangement A1 comprising steering member 10 comprising the front fastening member 12, rear fastening member 14, front steering link 16, rear steering link 18, the first steering cylinder unit 30 and second steering cylinder unit 32.

The steering device D may comprise a protective housing, not shown, arranged to surround and protect parts of the steering device D.

Figures 4A, 4B:
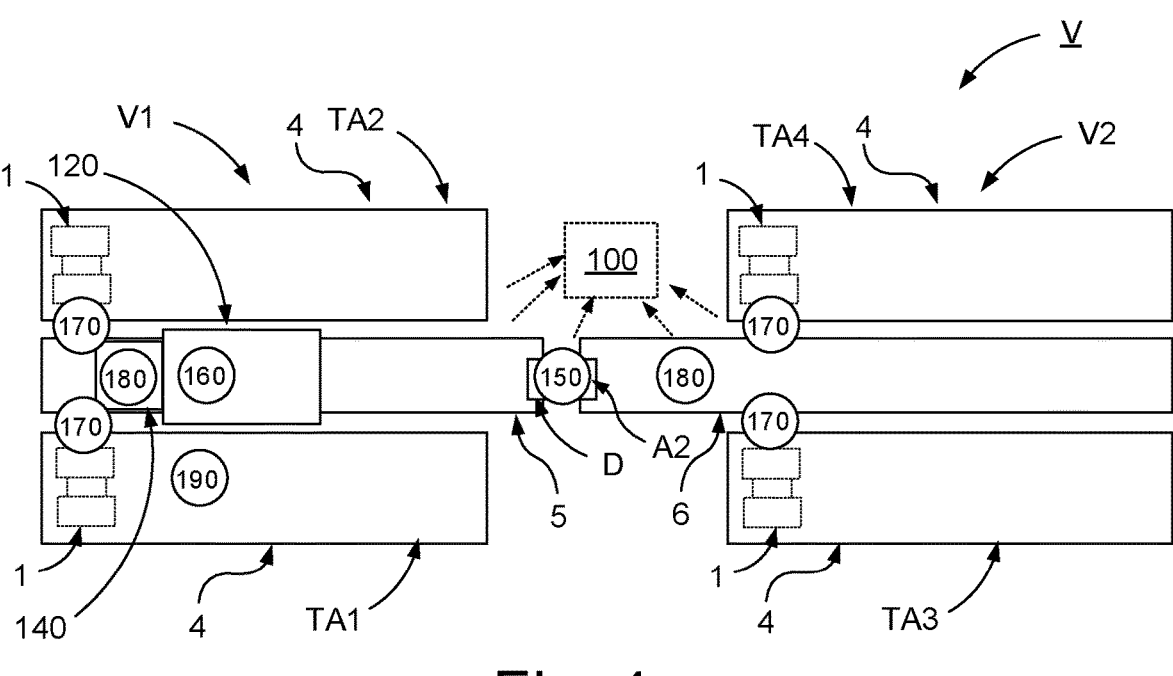
FIG. 4a schematically illustrates a plan view of an articulated tracked vehicle equipped with sensors for providing basis for controlling driving operation of the vehicle according to an embodiment of the present disclosure.
FIG. 4b schematically illustrates a plan view of the articulated tracked vehicle in FIG. 4a equipped with control members for controlling driving operation of the vehicle according to an embodiment of the present disclosure.

FIG. 4*a* schematically illustrates a plan view of an articulated tracked vehicle V equipped with sensors for providing basis for controlling driving operation of the vehicle V according to an embodiment of the present disclosure. FIG. 4*b* schematically illustrates a plan view of the articulated tracked vehicle V in FIG. 4*a* equipped with control members for controlling driving operation of the vehicle according to an embodiment of the present disclosure.

The articulated tracked vehicle V comprises a first vehicle unit V1 and a second vehicle unit V2 steerably connected to the first vehicle unit by means of a steering device D for mutually pivoting the vehicle units V1, V2 of the articulated tracked vehicle V. The mutual pivoting comprises roll movement about a roll axis. The steering device D comprises a roll arrangement A2 for the roll movement. The first vehicle unit V1 is here the leading vehicle unit and the second vehicle unit V2 is here the trailing vehicle unit.

The first vehicle unit V1 comprises a track assembly pair TA1, TA2, comprising a left track assembly TA1 and a right track assembly TA2 for driving the first vehicle unit V1. The second vehicle unit V2 comprises a track assembly pair TA3, TA4 comprising a left track assembly TA3 and a right track assembly TA4 for driving the second vehicle unit V2.

The first vehicle unit V1 comprises a vehicle body 5/vehicle chassis 5. The track assembly pair TA1, TA2 of the first vehicle unit V1 may be suspendedly connected to the vehicle body 5. The second vehicle unit V2 comprises a vehicle body 6/vehicle chassis. The track assembly pair TA3, TA4 of the second vehicle unit V2 may be suspendedly connected to the vehicle body 6.

Each track assembly comprises a drive wheel 1. Each track assembly may further comprise a tension wheel and a set of road wheels, not shown, and an endless track 4 arranged to run over said wheels.

Said articulated tracked vehicle V comprises a drive arrangement 120 for driving the drive wheels 1 for operating the vehicle V. The mutual pivoting comprises roll movement about a roll axis of the roll arrangement A2.

Said articulated tracked vehicle V comprises a brake system 130 for braking the drive wheels 1 of the vehicle V.

Said articulated tracked vehicle V comprises a transmission arrangement 140 for providing gear shift of the drive wheels 1 during operation of the vehicle V.

Said articulated tracked vehicle V comprises a control device 100 for controlling driving operation of the articulated tracked vehicle V.

As shown in FIG. 4*a*, the articulated tracked vehicle V may comprise a roll angle determination device 150 for determining the roll angle between said vehicle units V1, V2. The roll angle determination device 150 may comprise one or more angle sensors for determining the roll angle between said vehicle units V1, V2. The control device 100 may be arranged to receive information about roll angle between said vehicle units V1, V2 from the roll angle determination device 150.

As shown in FIG. 4*a*, the articulated tracked vehicle V may comprise a drive arrangement power determination device 160 for determining power of said drive arrangement 120. The control device 100 may be arranged to receive information about power of said drive arrangement 120 from the drive arrangement power determination device 160.

As shown in FIG. 4*a*, the articulated tracked vehicle V may comprise a drive wheel speed determination device 170 for determining speed of the drive wheels 1 of the articulated tracked vehicle V. The wheel speed determination device 170 may comprise one or more wheel sensors arranged in connection to drive wheels 1. The control device 100 may be arranged to receive information about speed of the drive wheels 1 from the wheel speed determination device 170.

As shown in FIG. 4*a*, the articulated tracked vehicle V may comprise a transmission speed determination device 180 for determining speed of transmission of the transmission arrangement 140 of the articulated tracked vehicle V. The transmission speed determination device 180 may comprise one or more sensors arranged in connection to the transmission arrangement 140 of the articulated tracked vehicle so as to detect the transmission speed.

The control device 100 may be arranged to receive information about speed of transmission of the transmission arrangement 140 from the transmission speed determination device 180.

As shown in FIG. 4a, the articulated tracked vehicle V may comprise a steering wheel angle determination device 190 for determining steering wheel angle of steering wheel of the articulated tracked vehicle. The a steering wheel angle determination device 190 may comprise one or more sensors arranged in connection to the steering wheel of the articulated tracked vehicle so as to detect the steering wheel angle. The control device 100 may be arranged to receive information about steering wheel angle of steering wheel from the steering wheel angle determination device 190.

As shown in FIG. 4b, the control device 100 is configured to control the roll arrangement A2 by means of the control arrangement 110 so as to control mutual roll movement of said vehicle units for improved manoeuvrability and avoidance of the vehicle tipping over/rolling over. The control arrangement 110 may comprise a brake member for providing a brake function on roll arrangement A2 and/or a locking member for providing a locking function on the roll arrangement A2 and/or a damping member for providing an damping function on the roll arrangement A2 and/or an actuator member for providing an actuation function on the roll arrangement A2.

The control arrangement 110 may comprise an electric motor and/or a hydraulic motor configured to act on the roll arrangement A2. Such a motor may be configured to act via e.g. a gear arrangement, a belt arrangement, a chain arrangement or the like. The roll arrangement A2 may be controlled by means of an electric motor and/or a hydraulic motor configured to act on the roll arrangement via e.g. a gear arrangement, a belt arrangement, a chain arrangement or the like. The control arrangement 110 may comprise a linear hydraulic cylinder or actuator configured to be arranged transversely to the longitudinal extension of the steering device and hence longitudinal extension of the vehicle, wherein braking, damping, locking and/or actuation function may be integrated in such a linear hydraulic cylinder or actuator.

According to an aspect of the present disclosure, the control device 100, when controlling mutual roll movement of said vehicle units V1, V2 by controlling the control arrangement 110, may be configured to perform said control based on one or more of: determined roll angle between said vehicle units; determined power of said driving arrangement 120; determined speed of drive wheels 1; determined transmission speed of transmission arrangement 140.

As shown in FIG. 4b, the control device 100 may be configured to control the power provision of the drive arrangement 120 so as to further facilitate controlling mutual roll movement of said vehicle units V1, V2 for improved manoeuvrability and avoidance of the vehicle tipping over/rolling over. The control of power provision the drive arrangement 120 may be performed by means of a power provision control member 122 controlled by the control device 100.

According to an aspect of the present disclosure, the control device 100, when controlling mutual roll movement of said vehicle units V1, V2 by controlling the power provision of the drive arrangement 120, may be configured to perform said control based on one or more of: determined roll angle between said vehicle units; determined power of said driving arrangement 120; determined speed of drive wheels 1; determined transmission speed of transmission arrangement 140. According to an aspect of the present disclosure, the control device 100, when controlling mutual roll movement of said vehicle units V1, V2 by controlling the power provision of the drive arrangement 120, may be configured to perform said control based on and/or considering said control of the mutual roll movement of said vehicle units V1, V2 by controlling said roll arrangement A2 by means of said control arrangement 110.

As shown in FIG. 4b, the control device 100 may be configured to control the braking system 130 of the vehicle V so as to further facilitate controlling mutual roll movement of said vehicle units V1, V2 for improved manoeuvrability and avoidance of the vehicle tipping over/rolling over.

According to an aspect of the present disclosure, the control device 100, when controlling mutual roll movement of said vehicle units V1, V2 by controlling the braking system 130, may be configured to perform said control based on one or more of: determined roll angle between said vehicle units; determined power of said driving arrangement 120; determined speed of drive wheels 1; determined transmission speed of transmission arrangement 140. According to an aspect of the present disclosure, the control device 100, when controlling mutual roll movement of said vehicle units V1, V2 by controlling the braking system 130, may be configured to perform said control based on and/or considering said control of the mutual roll movement of said vehicle units V1, V2 by controlling said roll arrangement A2 by means of said control arrangement 110.

As shown in FIG. 4b, the control device 100 may be configured to control the transmission speed of the transmission arrangement 140 so as to further facilitate controlling mutual roll movement of said vehicle units V1, V2 for improved manoeuvrability and avoidance of the vehicle tipping over/rolling over.

According to an aspect of the present disclosure, the control device 100, when controlling mutual roll movement of said vehicle units V1, V2 by controlling the transmission speed of the transmission arrangement 140, may be configured to perform said control based on one or more of: determined roll angle between said vehicle units; determined power of said driving arrangement 120; determined speed of drive wheels 1; determined transmission speed of transmission arrangement 140. According to an aspect of the present disclosure, the control device 100, when controlling mutual roll movement of said vehicle units V1, V2 by controlling the transmission speed of the transmission arrangement 140, may be configured to perform said control based on and/or considering said control of the mutual roll movement of said vehicle units V1, V2 by controlling said roll arrangement A2 by means of said control arrangement 110.

According to an aspect of the present disclosure, the control device 100, when controlling mutual roll movement of said vehicle units V1, V2 by controlling said roll arrangement A2 by means of said control arrangement 110 so as to reduce the risk of the vehicle tipping over may be configured to perform said control based on and/or considering said control of the mutual roll movement of said vehicle units V1, V2 by means of one or more of: power provision of the drive arrangement 120; said braking system 130 of the vehicle; and said transmission arrangement 140 of the vehicle.

According to an aspect of the present disclosure, the control device 100, when controlling the roll arrangement A2 of the steering device D by means of said control arrangement 110 and controlling one or more of: power provision of the drive arrangement 120; said braking system 130 of the vehicle; and said transmission arrangement 140 of the vehicle may be configured to cooperatively perform and adapt said control during drive of the vehicle so as to optimize control of mutual roll movement of said vehicle units so as to reduce the risk of the vehicle tipping over.

According to an aspect of the present disclosure, the control device 100, when controlling one or more of: power provision of the drive arrangement 120; said braking system 130 of the vehicle; and said transmission arrangement 140 of the vehicle so as to control mutual roll movement of said vehicle units so as to reduce the risk of the vehicle tipping over, may be configured to perform said control based on and/or considering said control of said roll arrangement A2 of the steering device by means of said control arrangement 110.

Figure 5:
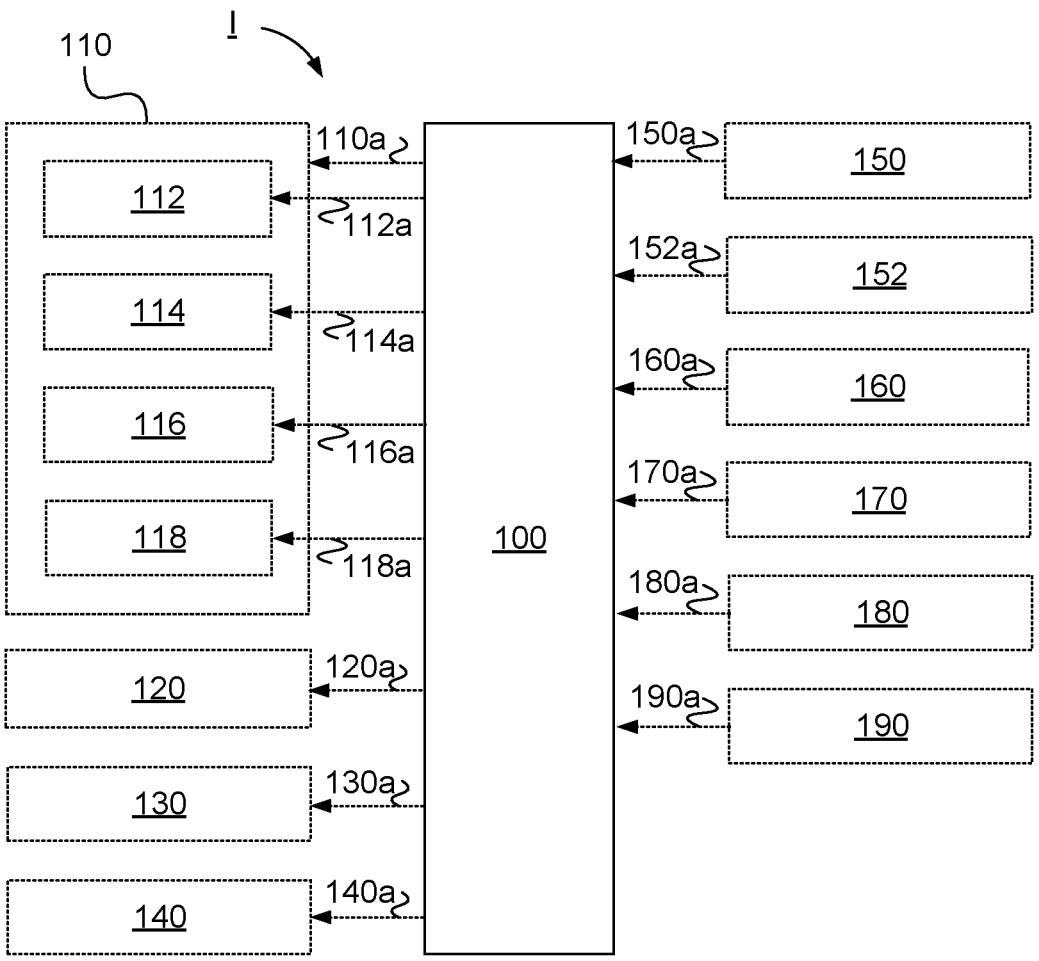
FIG. 5 schematically illustrates a block diagram of a control device for controlling steering of an articulated tracked vehicle according to an embodiment of the present disclosure.

FIG. 5 schematically illustrates a block diagram of a control device 100 for controlling driving operation of an articulated tracked vehicle according to an embodiment of the present disclosure.

Said articulated tracked vehicle comprises a drive arrangement for driving drive wheels for operating the vehicle. The articulated tracked vehicle comprises a first vehicle unit and a second vehicle unit steerably connected to the first vehicle unit by means of a steering device for mutually pivoting said vehicle units. The mutual pivoting comprises roll movement about a roll axis. The steering device comprises a roll arrangement for said roll movement.

The steering device may be any suitable steering device with a steering axis for providing mutual pivoting of the vehicle units comprising roll movement about a roll axis. The steering device may further comprise a steering axis for providing mutual pivoting of the vehicle units comprising steering movement about the steering axis. The steering device may be a steering device as described with reference to FIG. 2a-b, 3a-b. The roll arrangement of the steering device may be any suitable roll arrangement having a rotation member configured to facilitate rotatable movement of the second vehicle unit relative to the first vehicle unit. The rotation member may be rotatably journalled in bearings in the steering device for facilitating rotational movement of a member of the steering device relative to another member of the steering device. One of the vehicle units is fixed to one of the members of the steering device and the other vehicle unit is fixed to the other member of the steering device, wherein one of the vehicle units is thus configured to be rotatable about the roll axis of the steering device and the other vehicle unit being non-rotatably arranged relative to the roll axis. The roll axis is configured to run in the longitudinal direction of the vehicle unit being attached to the steering device so that it is rotatable about the roll axis. The roll arrangement may be a roll arrangement described with reference to FIG. 2a-b, 3a-b.

The control device 100 is configured to control driving operation of an articulated tracked vehicle during operation of the vehicle.

The control device 100 for controlling driving operation of an articulated tracked vehicle may be comprised in a system I for controlling driving operation of an articulated tracked vehicle.

The control device 100 may be implemented as a separate entity or distributed in two or more physical entities. The control device 100 may comprise one or more computers. The control device 100 may thus be implemented or realised by the control device comprising a processor and a memory, the memory comprising instructions, which when executed by the processor causes the control device to perform the herein disclosed method.

The control device 100 may comprise one or more electronic control units, processing units, computers, server units or the like for controlling driving operation of an articulated tracked vehicle during operation of the vehicle. The control device 100 may comprise control device such as one or more electronic control units arranged on board a vehicle. The control device 100 may comprise one or more electronic control units of the vehicle.

The control device 100 may as mentioned comprise at least one processing unit. Processing unit may according to an aspect be denoted as processor. The control device 100 may comprise at least one processor. Said at least one processor may include any physical device having an electric circuit that performs logic operations on input data. For example, the at least one processor may include one or more integrated circuits, microchips, microcontrollers, microprocessors, all or part of a central processing unit (CPU), digital signal processor (DSP), field-programmable gate array (FPGA), or other circuits for executing instructions or performing logic operations.

The control device 100 may comprise a random access memory (RAM), a read-only memory (ROM), a hard disk, an optical disk, a magnetic medium, a flash memory or any other mechanism capable of storing instructions or data. The memory may be integrated with or embedded into the at least one processor, or be a separate memory hardware device.

According to an aspect of the present disclosure, actions and method steps described herein as being performed by the control device 100 may be performed by said at least one processor upon execution of a computer program stored in said memory.

The control device 100 is configured to control the roll arrangement of the steering device so as to control mutual roll movement of said vehicle units.

According to an aspect of the present disclosure the control device 100 may be configured to control the roll arrangement by means of a control arrangement 110. According to an aspect of the present disclosure the control arrangement 110 is operably connected to the control device 100.

According to an aspect of the present disclosure the system I for controlling driving operation of an articulated tracked vehicle may comprise the control arrangement 110.

The control arrangement 110 may comprise a brake member 112 for providing a brake function. The brake member 112 for providing a brake function may be arranged in connection to the roll arrangement so as to provide a braking function of the steering device so as to control mutual roll movement of said vehicle units. The brake member 112 may comprise a mechanically operated brake arranged in connection to the roll arrangement. The brake member 112 may comprise a hydraulically operated brake arranged in connection to the roll arrangement. The brake member 112 may comprise an electrically operated brake arranged in connection to the roll arrangement. The brake member 112 may be arranged in connection to the rotation member of the roll arrangement so as to facilitate providing a braking action for braking the rotation of the rotation member.

The control arrangement 110 may comprise a locking member 114 for providing a locking function. The locking member 114 for providing a locking function may be arranged in connection to the roll arrangement so as to provide a locking function of the steering device so as to control mutual roll movement of said vehicle units. The locking member 114 may comprise a mechanically operated lock arranged in connection to the roll arrangement.

The locking member 114 may comprise a hydraulically operated lock arranged in connection to the roll arrangement. The locking member 114 may comprise an electrically operated lock arranged in connection to the roll arrangement. The locking member 114 may be arranged in connection to the rotation member of the roll arrangement so as to facilitate providing a locking action for locking the rotation of the rotation member.

The control arrangement 110 may comprise a damping member 116 for providing a damping function. The damping member 116 for providing a damping function may be arranged in connection to the roll arrangement so as to provide a damping function of the steering device so as to control mutual roll movement of said vehicle units. The damping member 116 may comprise a mechanically operated damping member arranged in connection to the roll arrangement. The damping member 116 may comprise a hydraulically operated damping member arranged in connection to the roll arrangement. The damping member 116 may comprise an electrically operated damping member arranged in connection to the roll arrangement. The damping member 116 may be arranged in connection to the rotation member of the roll arrangement so as to facilitate providing a damping action for damping the rotation of the rotation member.

The control arrangement 110 may comprise an actuator member 118 for providing an actuation function. The actuation member 118 for providing an actuation function may be arranged in connection to the roll arrangement so as to provide an actuation function of the steering device so as to control mutual roll movement of said vehicle units. The actuation member 118 may comprise a mechanically operated actuation member arranged in connection to the roll arrangement. The actuation member 118 may comprise a hydraulically operated actuation member arranged in connection to the roll arrangement. The actuation member 118 may comprise an electrically operated actuation member arranged in connection to the roll arrangement. The actuation member 118 may be arranged in connection to the rotation member of the roll arrangement so as to facilitate providing a damping action for damping the rotation of the rotation member.

The control arrangement 110 may comprise a brake member 112 for providing a brake function and/or locking member 114 for providing a locking function and/or a damping member 116 for providing a damping function and/or an actuator member 118 for providing an actuation function.

According to an aspect of the present disclosure, the control device 100, when controlling mutual roll movement of said vehicle units, may further be configured to control one or more of: power provision of the drive arrangement 120 of the vehicle; a braking system 130 of the vehicle; and a transmission arrangement 140 of the vehicle.

The control device 100, when controlling mutual roll movement of said vehicle units, may, in addition to the controlling the control arrangement 110, be configured to control power provision of the drive arrangement 120 of the vehicle. The drive arrangement 120 may comprise an internal combustion engine and/or one or more electric machines for driving the vehicle, i.e. driving the drive wheels of the track assemblies of the vehicle.

The control device 100, when controlling mutual roll movement of said vehicle units, may, in addition to the controlling the control arrangement 110, be configured to control the braking system 130 of the vehicle. The braking system 130 of the vehicle may comprise brake members arranged in connection to the drive wheels of the track assemblies of the vehicle.

The control device 100, when controlling mutual roll movement of said vehicle units, may, in addition to the controlling the control arrangement 110, be configured to control the transmission arrangement 140 of the vehicle 140. The transmission arrangement of the vehicle 140 of the vehicle may comprise any suitable gear arrangement for providing gear shifts of the drive wheels of the track assemblies of the vehicle.

According to an aspect of the present disclosure, the control device 100, when controlling mutual steering movement of said vehicle units, may be configured to perform said control based on one or more of: steering angle between said vehicle units; power of said drive arrangement; speed of drive wheels; speed of transmission; steering wheel angle of steering wheel of vehicle.

The control device 100 may be configured to determine roll angle between said vehicle units as a basis for controlling mutual roll movement of said vehicle units.

According to an aspect of the present disclosure the system I for controlling driving operation of an articulated tracked vehicle may comprise a roll angle determination device 150 for determining the roll angle between said vehicle units. The roll angle determination device 150 may comprise one or more angle sensors for determining the roll angle between said vehicle units. The one or more angle sensors may be arranged in connection to the roll arrangement of the steering device for determining the roll angle between said vehicle units.

According to an aspect of the present disclosure the system I for controlling driving operation of an articulated tracked vehicle may comprise a steering angle determination device 152 for determining the steering angle between said vehicle units. The steering angle determination device 152 may comprise one or more angle sensors for determining the steering angle between said vehicle units. The one or more angle sensors may be arranged in connection to the steering device for determining the steering angle between said vehicle units.

The control device 100 may be configured to determine power of said drive arrangement as a basis for controlling mutual roll movement of said vehicle units.

According to an aspect of the present disclosure the system I for controlling driving operation of an articulated tracked vehicle may comprise a drive arrangement power determination device 160 for determining power of said drive arrangement.

The control device 100 may be configured to determine speed of drive wheels of the articulated tracked vehicle as a basis for controlling mutual roll movement of said vehicle units.

According to an aspect of the present disclosure the system I for controlling driving operation of an articulated tracked vehicle may comprise a drive wheel speed determination device 170 for determining speed of drive wheels of the articulated tracked vehicle. The wheel speed determination device 170 may comprise one or more wheel sensors arranged in connection to drive wheels of the articulated tracked vehicle so as to detect speed of the thus detected drive wheel.

The control device 100 may be configured to determine speed of transmission of the articulated tracked vehicle as a basis for controlling mutual roll movement of said vehicle units.

According to an aspect of the present disclosure the system I for controlling driving operation of an articulated tracked vehicle may comprise a transmission speed determination device 180 for determining speed of transmission of the articulated tracked vehicle. The transmission speed determination device 180 may comprise one or more sensors arranged in connection to transmission of the articulated tracked vehicle so as to detect the transmission speed.

The control device 100 may be configured to determine steering wheel angle of steering wheel of the articulated tracked vehicle as a basis for controlling mutual roll movement of said vehicle units.

According to an aspect of the present disclosure the system I for controlling driving operation of an articulated tracked vehicle may comprise a steering wheel angle determination device 190 for determining steering wheel angle of steering wheel of the articulated tracked vehicle. The a steering wheel angle determination device 190 may comprise one or more sensors arranged in connection to the steering wheel of the articulated tracked vehicle so as to detect the steering wheel angle.

The control device 100 may be configured to determine the stability of the ground on which the vehicle is driving. The control device 100 may be configured to determine the softness of the ground and/or unevenness of the ground. The control device 100 may be configured to determine the stability of the ground base on one or more sensors arranged on board the vehicle. The control device 100 may be configured to determine the stability of the ground base on weather data.

The control device 100 may be configured to determine possible risk of the trailing vehicle unit ending up not following the tracks created by the leading vehicle unit of the articulated tracked vehicle based on thus determined stability of the ground on which the vehicle is driving. The control device 100 may be configured to determine the risk of the trailing vehicle unit derailing from the tracks created by the leading vehicle. The control device 100 may be configured to take action so as to reduce the risk of the trailing vehicle derailing from the tracks of the leading vehicle if there is a certain risk, e.g. if the risk exceeds a certain threshold. The action may comprise controlling roll movement e.g. by providing a braking action on the roll arrangement.

The control device 100 may be configured to determine the speed of the vehicle. Speed of the vehicle may be detected by means of any suitable speedometer or the like. The control device 100 may be configured to take action so as to reduce relative roll movement of the vehicle units and reduce the risk of the trailing vehicle unit tipping over, if a certain instability of the ground has been determined. The action may comprise controlling roll movement e.g. by providing a damping action, locking action or the like on the roll arrangement.

The control device 100 may be configured to determine coincident spinning of tracks of track assembly on one side of leading vehicle unit and spinning of tracks of track assembly on opposite side of trailing vehicle unit. Coincident spinning of tracks may be detected by any suitable detector. The control device 100 may be configured to take action so as to reduce relative roll movement of the vehicle units if such coincident spinning of tracks has been determined. The action may comprise controlling roll movement e.g. by providing a damping action, locking action or the like on the roll arrangement.

The control device 100 may be configured to determine load and load distribution of the respective vehicle unit and possible displaced load e.g. to one side in one of the vehicle units and the other side of the other vehicle unit. The control device 100 may be configured to determine load and load distribution based on one or more load sensors arranged in connection to the respective vehicle unit. For an amphibious articulated tracked vehicle, during a swimming operation, the control device 100 may be configured to take action so as to facilitate swimming, if such a displace load distribution in the respective vehicle unit is determined. The action may comprise controlling roll movement so as to reduce the roll angle between the vehicle units.

The control device 100 may be configured to determine risk of tipping about the roll axis of the trailing or leading vehicle unit. The control device 100 may be configured to take action comprising controlling roll movement and/or providing reduced power of said drive arrangement and/or braking of one or more tracks of track assemblies of the vehicle unit, if there is a certain risk of such tipping of a vehicle unit.

According to an aspect of the present disclosure, the control device 100 may, via a link 150a, be operably connected to the roll angle determination device 150. According to an aspect of the present disclosure, the control device 100 may via the link 150a be arranged to receive a signal from the roll angle determination device 150 representing data about roll angle between the vehicle units of the articulated tracked vehicle.

According to an aspect of the present disclosure, the control device 100 may, via a link 152a, be operably connected to the steering angle determination device 152. According to an aspect of the present disclosure, the control device 100 may via the link 152a be arranged to receive a signal from the steering angle determination device 152 representing data about steering angle between the vehicle units of the articulated tracked vehicle.

According to an aspect of the present disclosure, the control device 100 may, via a link 160a, be operably connected to the drive arrangement power determination device 160. According to an aspect of the present disclosure, the control device 100 may via the link 160a be arranged to receive a signal from the drive arrangement power determination device 160 representing data about current power of the drive arrangement of the articulated tracked vehicle.

According to an aspect of the present disclosure, the control device 100 may, via a link 170a, be operably connected to the drive wheel speed determination device 170. According to an aspect of the present disclosure, the control device 100 may via the link 170a be arranged to receive a signal from the drive wheel speed determination device 170 representing data about drive wheel speed of drive wheels of the articulated tracked vehicle.

According to an aspect of the present disclosure, the control device 100 may, via a link 180a, be operably connected to the transmission speed determination device 180. According to an aspect of the present disclosure, the control device 100 may via the link 180a be arranged to receive a signal from the transmission speed determination device 180 representing data about transmission speed of transmission arrangement of the articulated tracked vehicle.

According to an aspect of the present disclosure, the control device 100 may, via a link 190a, be operably connected to the steering wheel angle determination device 190. According to an aspect of the present disclosure, the control device 100 may via the link 190a be arranged to receive a signal from the steering wheel angle determination device 190 representing data about steering wheel angle of steering wheel of the articulated tracked vehicle.

According to an aspect of the present disclosure, the control device 100 may, via a link 110a, be operably connected to the control arrangement 110. According to an aspect of the present disclosure, the control device 100 may via the link 110a be arranged to send a signal to the control arrangement 110 representing data about controlling the roll arrangement of the steering device so as to control mutual roll movement of said vehicle units. The data about controlling the roll arrangement of the steering device may be based on processed data about roll angle between the vehicle units from the roll angle determination device 150. The data about controlling the roll arrangement of the steering device may in addition be based on one or more of data about power of said drive arrangement from the drive arrangement power determination device 160, data about speed of drive wheels from the drive wheel speed determination device 170, data about speed of transmission from the transmission speed determination device 180, and data about steering wheel angle from the steering wheel angle determination device 190.

According to an aspect of the present disclosure, the control device 100 may, via a link 112a, be operably connected to the brake member 112. According to an aspect of the present disclosure, the control device 100 may via the link 112a be arranged to send a signal to the brake member 112 representing data about providing a braking action on the roll arrangement of the steering device so as to control mutual roll movement of said vehicle units.

According to an aspect of the present disclosure, the control device 100 may, via a link 114a, be operably connected to the locking member 114. According to an aspect of the present disclosure, the control device 100 may via the link 114a be arranged to send a signal to the locking member 114 representing data about providing a locking action on the roll arrangement of the steering device so as to control mutual roll movement of said vehicle units.

According to an aspect of the present disclosure, the control device 100 may, via a link 116a, be operably connected to the damping member 116. According to an aspect of the present disclosure, the control device 100 may via the link 116a be arranged to send a signal to the damping member 116 representing data about providing a damping action on the roll arrangement of the steering device so as to control mutual roll movement of said vehicle units.

According to an aspect of the present disclosure, the control device 100 may, via a link 118a, be operably connected to the actuation member 118. According to an aspect of the present disclosure, the control device 100 may via the link 118a be arranged to send a signal to the actuation member 118 representing data about providing an actuation action on the roll arrangement of the steering device so as to control mutual roll movement of said vehicle units.

According to an aspect of the present disclosure, the control device 100 may, via a link 120a, be operably connected to the drive arrangement 120. According to an aspect of the present disclosure, the control device 100 may via the link 120a be arranged to send a signal to the drive arrangement 120 representing data about controlling the drive arrangement so as to control mutual roll movement of said vehicle units. The data about controlling the drive arrangement 120 so as to control mutual roll movement of said vehicle units may be based on processed data about steering angle between the vehicle units from the roll angle determination device 150. The data about controlling the drive arrangement 120 so as to control mutual roll movement of said vehicle units may in addition be based on one or more of data about power of said drive arrangement from the drive arrangement power determination device 160, data about speed of drive wheels from the drive wheel speed determination device 170, data about speed of transmission from the transmission speed determination device 180, and data about steering wheel angle from the steering wheel angle determination device 190.

According to an aspect of the present disclosure, the control device 100 may, via a link 130a, be operably connected to the braking system 130 of the vehicle. According to an aspect of the present disclosure, the control device 100 may via the link 130a be arranged to send a signal to the braking system 130 representing data about controlling the braking system so as to control mutual roll movement of said vehicle units. The data about controlling the braking system 130 so as to control mutual roll movement of said vehicle units may be based on processed data about roll angle between the vehicle units from the roll angle determination device 150. The data about controlling the braking system 130 so as to control mutual roll movement of said vehicle units may in addition be based on one or more of data about power of said drive arrangement from the drive arrangement power determination device 160, data about speed of drive wheels from the drive wheel speed determination device 170, data about speed of transmission from the transmission speed determination device 180, and data about steering wheel angle from the steering wheel angle determination device 190.

According to an aspect of the present disclosure, the control device 100 may, via a link 140a, be operably connected to the transmission arrangement 140. According to an aspect of the present disclosure, the control device 100 may via the link 140a be arranged to send a signal to the transmission arrangement 140 representing data about controlling the transmission arrangement so as to control mutual roll movement of said vehicle units. The data about controlling the transmission arrangement 140 so as to control mutual roll movement of said vehicle units may be based on processed data about roll angle between the vehicle units from the roll angle determination device 150. The data about controlling the transmission arrangement 140 so as to control mutual roll movement of said vehicle units may in addition be based on one or more of data about power of said drive arrangement from the drive arrangement power determination device 160, data about speed of drive wheels from the drive wheel speed determination device 170, data about speed of transmission from the transmission speed determination device 180, and data about steering wheel angle from the steering wheel angle determination device 190.

The control device 100, when controlling mutual roll movement of said vehicle units V1, V2, so as to avoid vehicle tipping over/rolling, may thus be configured to perform said control by controlling said roll arrangement A2 and, in order to further improve manoeuvrability and avoidance of the vehicle tipping over/rolling over, in addition, and cooperatively and adaptively, control one or more of: power provision of the drive arrangement 120; the braking system 130 of the vehicle; and the transmission arrangement 140 of the vehicle.

The control device 100 for controlling driving operation of an articulated tracked vehicle is, according to an embodiment, adapted to perform the method M1 described below with reference to FIG. 6.

The control device 100 for controlling driving operation of an articulated tracked vehicle is, according to an embodiment, adapted to perform the method M2 described below with reference to FIG. 7.

FIG. 6 schematically illustrates a flow chart of a method M1 performed by a control device for controlling driving operation of an articulated tracked vehicle according to an embodiment of the present disclosure.

Said articulated tracked vehicle comprises a drive arrangement for operating the vehicle. The articulated tracked vehicle comprises a first vehicle unit and a second vehicle unit steerably connected to the first vehicle unit by means of a steering device for mutually pivoting said vehicle units. The mutual pivoting comprises roll movement about a roll axis. The steering device comprises a roll arrangement for said roll movement.

According to the embodiment the method comprises a step S1. In this step the roll arrangement of the steering device is controlled so as to control mutual roll movement of said vehicle units.

The method M1 performed by a control device for controlling driving operation of an articulated tracked vehicle is according to an embodiment adapted to be performed by the control device 100 described above with reference to FIG. 5.

The method M1 performed by a control device for controlling driving operation of an articulated tracked vehicle is according to an embodiment adapted to be performed by the system I described above with reference to FIG. 5.

FIG. 7 schematically illustrates a flow chart of a method M2 performed by a control device for controlling driving operation of an articulated tracked vehicle according to an embodiment of the present disclosure.

Said articulated tracked vehicle comprises a drive arrangement for operating the vehicle. The articulated tracked vehicle comprises a first vehicle unit and a second vehicle unit steerably connected to the first vehicle unit by means of a steering device for mutually pivoting said vehicle units. The mutual pivoting comprises roll movement about a roll axis. The steering device comprises a roll arrangement for said roll movement.

The steering device may be any suitable steering device with a steering axis for providing mutual pivoting of the vehicle units comprising roll movement about a roll axis. The steering device may further comprise a steering axis for providing mutual pivoting of the vehicle units comprising steering movement about the steering axis. The steering device may be a steering device as described with reference to FIG. 2a-b, 3a-b. The roll arrangement of the steering device may be any suitable roll arrangement having a rotation member configured to facilitate rotatable movement of the second vehicle unit relative to the first vehicle unit. The rotation member may be rotatably journalled in bearings in the steering device for facilitating rotational movement of a member of the steering device relative to another member of the steering device. One of the vehicle units is fixed to one of the members of the steering device and the other vehicle unit is fixed to the other member of the steering device, wherein one of the vehicle units is thus configured to be rotatable about the roll axis of the steering device and the other vehicle unit being non-rotatably arranged relative to the roll axis. The roll axis is configured to run in the longitudinal direction of the vehicle unit being attached to the steering device so that it is rotatable about the roll axis. The roll arrangement may be a roll arrangement described with reference to FIG. 2a-b, 3a-b.

According to the embodiment the method comprises a step S11. In this step the roll arrangement of the steering device is controlled by means of a control arrangement so as to control mutual roll movement of said vehicle units. The control arrangement may be any suitable control arrangement by means of which the roll arrangement may be controlled, e.g. by locking and/or damping rotation member or the like of the control arrangement so as to control mutual roll movement of said vehicle units of the articulated tracked vehicle.

According to an aspect of the present disclosure the method step of controlling the roll arrangement by means of the control arrangement may comprise the step(s) S11A of providing a brake function and/or a locking function and/or a damping function and/or an actuation function of the control arrangement.

According to an aspect of the present disclosure the method step of controlling the roll arrangement by means of the control arrangement may comprise the step(s) S11A of providing a brake function and/or a locking function and/or a damping function and/or an actuation function on the roll arrangement by means of the control arrangement.

The step(s) S11A may thus comprise a step of providing a brake function on the roll arrangement by means of a brake member. The brake member may be any suitable brake member for providing a brake function on the roll arrangement, e.g. a brake member 112 as described with reference to FIG. 5.

The step(s) S11A may thus comprise a step of providing a locking function on the roll arrangement by means of a locking member. The locking member may be any suitable locking member for providing a locking function on the roll arrangement, e.g. a locking member 114 as described with reference to FIG. 5.

The step(s) S11A may thus comprise a step of providing a damping function on the roll arrangement by means of a damping member. The damping member may be any suitable damping member for providing a damping function on the roll arrangement, e.g. a damping member 116 as described with reference to FIG. 5.

The step(s) S11A may thus comprise a step of providing an actuation function on the roll arrangement by means of an actuator member. The actuator member may be any suitable actuator member for providing an actuation function on the roll arrangement, e.g. an actuator member 118 as described with reference to FIG. 5.

According to an aspect of the present disclosure the method step S11 of controlling mutual steering movement of said vehicle units may further comprise the step(s) S11B of controlling one or more of: power provision of the drive arrangement; a braking system of the vehicle; and a transmission arrangement of the vehicle.

The step(s) S11B may thus comprise a step of controlling power provision of the drive arrangement of the articulated tracked vehicle. The drive arrangement may comprise an internal combustion engine and/or one or more electric machines for driving the vehicle, i.e. driving the drive wheels of the track assemblies of the vehicle. The drive arrangement may be a drive arrangement 120 as described with reference to FIG. 5.

The step(s) S11B may thus comprise a step of controlling the braking system of the articulated tracked vehicle. The braking system of the vehicle may comprise brake members arranged in connection to the drive wheels of the track assemblies of the vehicle. The braking system may be a braking system 130 as described with reference to FIG. 5.

The step(s) S11B may thus comprise a step of controlling the transmission arrangement of the articulated tracked vehicle. The transmission arrangement of the vehicle 140 of the vehicle may comprise any suitable gear arrangement for providing gear shifts of the drive wheels of the track assemblies of the vehicle. The transmission arrangement may be a transmission arrangement 140 as described with reference to FIG. 5.

According to an aspect of the present disclosure the method step S11 of controlling mutual steering movement of said vehicle units may further comprise the step(s) S11C of performing said control based on one or more of: roll angle between said vehicle units; steering angle between said vehicle units; power of said drive arrangement; speed of drive wheels; speed of transmission.

According to an aspect of the present disclosure, the method may comprise the step of determining one or more of: roll angle between said vehicle units; steering angle between said vehicle units; power of said drive arrangement; speed of drive wheels; speed of transmission.

According to an aspect of the present disclosure, the method may comprise the step of receiving information about one or more of: roll angle between said vehicle units from roll angle determination device; steering angle between said vehicle units from steering angle determination device; power of said drive arrangement from power determination device; speed of drive wheels from drive wheel speed determination device; speed of transmission from transmission speed determination device.

According to an aspect of the present disclosure, the step(s) S11A of providing a brake function and/or a locking function and/or a damping function and/or an actuation function on the roll arrangement by means of the control arrangement for controlling mutual roll movement of said vehicle units, may be based on received information about one or more of: roll angle between said vehicle units from roll angle determination device; steering angle between said vehicle units from steering angle determination device; power of said drive arrangement from power determination device; speed of drive wheels from drive wheel speed determination device; speed of transmission from transmission speed determination device.

According to an aspect of the present disclosure the step(s) S11B of controlling one or more of: power provision of the drive arrangement; a braking system of the vehicle; and a transmission arrangement of the vehicle, may be based on and/or considering received information about one or more of: roll angle between said vehicle units from roll angle determination device; steering angle between said vehicle units from steering angle determination device; power of said drive arrangement from power determination device; speed of drive wheels from drive wheel speed determination device; speed of transmission from transmission speed determination device.

According to an aspect of the present disclosure the step(s) S11B of controlling one or more of: power provision of the drive arrangement; a braking system of the vehicle; and a transmission arrangement of the vehicle, may be based on and/or considering the step(s) S11A of providing a brake function and/or a locking function and/or a damping function and/or an actuation function on the roll arrangement by means of the control arrangement.

According to an aspect of the present disclosure, the step(s) S11A of providing a brake function and/or a locking function and/or a damping function and/or an actuation function on the roll arrangement by means of the control arrangement for controlling mutual roll movement of said vehicle units, may be performed cooperatively and adaptively with the step(s) S11B of controlling one or more of: power provision of the drive arrangement; a braking system of the vehicle; and a transmission arrangement of the vehicle.

The method may comprise the step of determining the stability of the ground on which the vehicle is driving. The step of determining the stability of the ground on which the vehicle is driving may comprise determining the softness of the ground and/or unevenness of the ground. The step of determining the stability of the ground may be so as to identify possible risk of the trailing vehicle unit ending up not following the tracks created by the leading vehicle unit of the articulated tracked vehicle.

The method may comprise the step of determining the risk of the trailing vehicle unit derailing from the tracks created by the leading vehicle; and, taking action so as to reduce the risk of the trailing vehicle derailing from the tracks of the leading vehicle if there is a certain risk, e.g. if the risk exceeds a certain threshold. The step of taking action may comprise controlling roll movement e.g. by providing a braking action on the roll arrangement.

The method may comprise the step of determining the speed of the vehicle; and, if a certain instability of the ground has been determined, taking action so as to reduce relative roll movement of the vehicle units and reduce the risk of the trailing vehicle unit tipping over. The step of taking action may comprise controlling roll movement e.g. by providing a damping action, locking action or the like on the roll arrangement.

The method may comprise the step of determining coincident spinning of tracks of track assembly on one side of leading vehicle unit and spinning of tracks of track assembly on opposite side of trailing vehicle unit; and, if so, taking action so as to reduce relative roll movement of the vehicle units. The step of taking action may comprise controlling roll movement e.g. by providing a damping action, locking action or the like on the roll arrangement.

The method may comprise the step of determining load and load distribution of the respective vehicle unit and possible displaced load e.g. to one side in one of the vehicle units and the other side of the other vehicle unit. For an amphibious articulated tracked vehicle, during a swimming operation, the method may comprise the step of taking action so as to facilitate swimming, if such a displace load distribution in the respective vehicle unit is determined. The step of taking action may comprise controlling roll movement so as to reduce the roll angle between the vehicle units.

The method may comprise the step of determining risk of tipping about the roll axis of the trailing or leading vehicle unit; and, if there is a certain risk of such tipping of a vehicle unit, taking action comprising controlling roll movement and/or providing reduced power of said drive arrangement and/or braking of one or more tracks of track assemblies of the vehicle units.

The method M2 performed by a control device for controlling driving operation of an articulated tracked vehicle is according to an embodiment adapted to be performed by the control device 100 described above with reference to FIG. 5.

The method M2 performed by a control device for controlling driving operation of an articulated tracked vehicle is according to an embodiment adapted to be performed by the system I described above with reference to FIG. 5.

Figure 8:
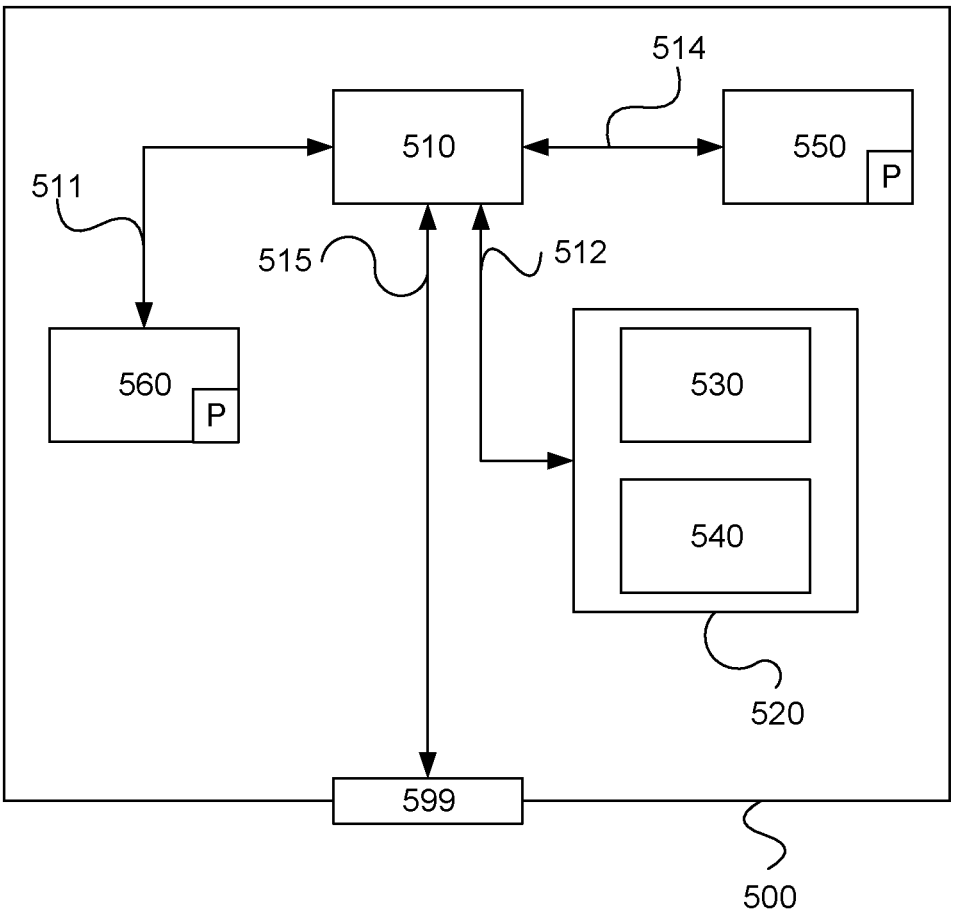
FIG. 8 schematically illustrates a computer according to an embodiment of the present invention.

With reference to FIG. 8, a diagram of a computer 500/apparatus 500 is shown. The control device 100 described with reference to FIG. 5 may according to an embodiment comprise apparatus 500. Apparatus 500 comprises a non-volatile memory 520, a data processing device 510 and a read/write memory 550. Non-volatile memory 520 has a first memory portion 530 wherein a computer program, such as an operating system, is stored for controlling the function of apparatus 500. Further, apparatus 500 comprises a bus controller, a serial communication port, I/O-means, an ND-converter, a time date entry and transmission unit, an event counter and an interrupt controller (not shown). Non-volatile memory 520 also has a second memory portion 540.

A computer program P is provided comprising routines for controlling driving operation of an articulated tracked vehicle.

Said articulated tracked vehicle comprises a drive arrangement for operating the vehicle. The articulated tracked vehicle comprises a first vehicle unit and a second vehicle unit steerably connected to the first vehicle unit by means of a steering device for mutually pivoting said vehicle units. The mutual pivoting comprises roll movement about a roll axis. The steering device comprises a roll arrangement for said roll movement.

The program P comprises routines for controlling the roll arrangement of the steering device so as to control mutual roll movement of said vehicle units.

The routines controlling the roll arrangement comprises routines for performing said control by means of a control arrangement.

The routines for controlling the roll arrangement by means of the control arrangement comprises routines for providing a brake function and/or a locking function and/or an damping function and/or an actuation function of the control arrangement.

The routines for controlling mutual roll movement of said vehicle units further comprises routines for controlling one or more of: power provision of the drive arrangement; a braking system of the vehicle; and a transmission arrangement of the vehicle.

The routines for controlling mutual roll movement of said vehicle units is performed based on one or more of: roll angle between said vehicle units; power of said drive arrangement; speed of drive wheels; speed of transmission The computer program P may be stored in an executable manner or in a compressed condition in a separate memory 560 and/or in read/write memory 550.

When it is stated that data processing device 510 performs a certain function it should be understood that data processing device 510 performs a certain part of the program which is stored in separate memory 560, or a certain part of the program which is stored in read/write memory 550.

Data processing device 510 may communicate with a data communications port 599 by means of a data bus 515. Non-volatile memory 520 is adapted for communication with data processing device 510 via a data bus 512. Separate memory 560 is adapted for communication with data processing device 510 via a data bus 511. Read/write memory 550 is adapted for communication with data processing device 510 via a data bus 514. To the data communications port 599 e.g. the links connected to the control unit 100 may be connected.

When data is received on data port 599 it is temporarily stored in second memory portion 540. When the received input data has been temporarily stored, data processing device 510 is set up to perform execution of code in a manner described above.

The signals received on data port 599 may be used by apparatus 500 for controlling the roll arrangement of the steering device so as to control mutual roll movement of said vehicle units.

The signals used by apparatus 500 for controlling the roll arrangement by means of the control arrangement comprises signals used for providing a brake function and/or a locking function and/or an damping function and/or an actuation function of the control arrangement.

The signals used by apparatus 500 for controlling mutual roll movement of said vehicle units further comprises signals used for controlling one or more of: power provision of the drive arrangement; a braking system of the vehicle; and a transmission arrangement of the vehicle.

The signals used by apparatus 500 for controlling mutual roll movement of said vehicle units is performed based on one or more of: roll angle between said vehicle units; power of said drive arrangement; speed of drive wheels; speed of transmission.

Parts of the methods described herein may be performed by apparatus 500 by means of data processing device 510 running the program stored in separate memory 560 or read/write memory 550. When apparatus 500 runs the program, parts of the methods described herein are executed.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A method performed by a control device for controlling driving operation of an articulated tracked vehicle, said articulated tracked vehicle comprising a drive arrangement for driving drive wheels of the vehicle for operating the vehicle, a braking system for braking the drive wheels of the vehicle, a transmission arrangement for providing gear shift of the drive wheels, and a first vehicle unit and a second vehicle unit steerably connected to the first vehicle unit by a steering device for mutually pivoting said vehicle units, the mutual pivoting comprising roll movement about a roll axis, the steering device comprising a roll arrangement for said roll movement, the roll arrangement comprising a rotation member, a control arrangement being providing for controlling the roll arrangement, the method comprising the steps of:

determining coincident spinning of tracks on a side of the first vehicle unit and tracks on an opposite side of the second vehicle unit;

reducing relative roll movement of the vehicle units based on the determination of coincident spinning;

determining a power of said drive arrangement, a speed of the drive wheels, and a speed of transmission of said transmission arrangement; and controlling the roll arrangement of the steering device so as to control mutual roll movement of said vehicle units and reduce risk of the vehicle tipping over by the control arrangement acting on the rotation member based on the power of said drive arrangement, the speed of the drive wheels, and the speed of transmission of said transmission arrangement.

2. The method according to claim 1, wherein the step of controlling the roll arrangement by the control arrangement comprises providing a brake function and/or a locking function and/or a damping function and/or an actuation function of the control arrangement.

3. The method according to claim 1, wherein the step of controlling mutual roll movement of said vehicle units further comprises controlling a power provision of the drive arrangement; the braking system of the vehicle; and the transmission arrangement of the vehicle.

4. The method according to claim 1, wherein the step of controlling mutual roll movement of said vehicle units is further performed based on roll angle between said vehicle units.

5. A control device for controlling driving operation of an articulated tracked vehicle, said articulated tracked vehicle comprising a drive arrangement for driving drive wheels of the vehicle for operating the vehicle, a braking system for braking the drive wheels of the vehicle, and a transmission arrangement for providing gear shift of the drive wheels, and a first vehicle unit and a second vehicle unit steerably connected to the first vehicle unit by a steering device for mutually pivoting said vehicle units, the mutual pivoting comprising roll movement about a roll axis, the steering device comprising a roll arrangement for said roll movement, the roll arrangement comprising a rotation member, a control arrangement being provided for controlling the roll arrangement, the control device being configured to:

determine coincident spinning of tracks on a side of the first vehicle unit and tracks on an opposite side of the second vehicle unit;

reduce relative roll movement of the vehicle units based on the determination of coincident spinning;

receive information about a power of said drive arrangement, a speed of the drive wheels, and a speed of transmission of said transmission arrangement; and control the roll arrangement of the steering device so as to control mutual roll movement of said vehicle units and reduce the risk of the vehicle tipping over by the control arrangement acting on the rotation member based on the power of said drive arrangement, the speed of the drive wheels, and the speed of transmission of said transmission arrangement.

6. The control device according to claim 5, the control arrangement comprising a brake member for providing a brake function and/or a locking member for providing a locking function and/or a damping member for providing a damping function and/or an actuator member for providing an actuation function.

7. The control device according to claim 5, the control device, when controlling mutual roll movement of said vehicle units, further being configured to control a power provision of the drive arrangement; the braking system of the vehicle; and the speed of transmission of the transmission arrangement of the vehicle.

8. The control device according to claim 5, the control device, when controlling mutual steering movement of said vehicle units, is further configured to perform said control based on roll angle between said vehicle units.

9. An articulated tracked vehicle comprising a control device according to claim 6.

10. A system for controlling driving operation of an articulated tracked vehicle, said system comprising a non-transitory memory storing program code which, when run on a control device or another computer connected to the control device, causes the control device to perform the method according to claim 1.

11. A non-transitory computer readable medium comprising instructions which, when executed by a computer, cause the computer to carry out the method according to claim 1.

\* \* \* \* \*